US012743464B2

(12) United States Patent
Wang et al.

(10) Patent No.: US 12,743,464 B2
(45) Date of Patent: Sep. 22, 2026

(54) CONTENT TAGGING

(71) Applicant: Snap Inc., Santa Monica, CA (US)

(72) Inventors: Xiaoyu Wang, Playa Vista, CA (US); Ning Xu, Irvine, CA (US); Ning Zhang, Los Angeles, CA (US); Vitor Rocha de Carvalho, San Diego, CA (US); Jia Li, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 344 days.

(21) Appl. No.: 18/378,376

(22) Filed: Oct. 10, 2023

(65) Prior Publication Data

US 2024/0037141 A1 Feb. 1, 2024

Related U.S. Application Data

(63) Continuation of application No. 17/248,386, filed on Jan. 22, 2021, now Pat. No. 11,822,600, which is a (Continued)

(51) Int. Cl.
*G06F 16/58* (2019.01)
*G06F 16/587* (2019.01)

(Continued)

(52) U.S. Cl.
CPC ........ *G06F 16/5866* (2019.01); *G06F 16/587* (2019.01); *G06F 16/9038* (2019.01);

(Continued)

(58) Field of Classification Search
CPC .. G06F 16/5866; G06F 16/9038; G06F 18/24; G06N 3/04; G06N 3/045;

(Continued)

(56) References Cited

U.S. PATENT DOCUMENTS 5,754,939 A 5/1998 Herz et al.
5,822,452 A * 10/1998 Tarolli .................... G06T 9/002 345/582

(Continued)

FOREIGN PATENT DOCUMENTS

CA 2887596 A1 7/2015
EP 3267362 A1 1/2018

(Continued)

OTHER PUBLICATIONS

Liu et al., A Versatile Compression Method for Floating-point Data Stream, 2013.*

(Continued)

*Primary Examiner* — John B Strege
(74) *Attorney, Agent, or Firm* — Schwegman Lundberg & Woessner, P.A.

(57) ABSTRACT

Systems, methods, devices, media, and computer readable instructions are described for local image tagging in a resource constrained environment. One embodiment involves processing image data using a deep convolutional neural network (DCNN) comprising at least a first subgraph and a second subgraph, the first subgraph comprising at least a first layer and a second layer, processing, the image data using at least the first layer of the first subgraph to generate first intermediate output data; processing, by the mobile device, the first intermediate output data using at least the second layer of the first subgraph to generate first subgraph output data, and in response to a determination that each layer reliant on the first intermediate data have completed processing, deleting the first intermediate data from the mobile device. Additional embodiments involve convolving entire pixel resolutions of the image data against kernels in different layers if the DCNN.

20 Claims, 13 Drawing Sheets

Related U.S. Application Data continuation of application No. 16/192,419, filed on Nov. 15, 2018, now Pat. No. 10,956,793, which is a continuation of application No. 15/247,697, filed on Aug. 25, 2016, now Pat. No. 10,157,333.

(60) Provisional application No. 62/358,461, filed on Jul. 5, 2016, provisional application No. 62/218,965, filed on Sep. 15, 2015.

(51) Int. Cl.

| | |
|---|---|
| ***G06F 16/9038*** | (2019.01) |
| ***G06F 18/24*** | (2023.01) |
| ***G06N 5/022*** | (2023.01) |
| ***G06T 1/00*** | (2006.01) |
| ***G06V 10/75*** | (2022.01) |
| ***G06V 10/764*** | (2022.01) |
| ***G06V 10/82*** | (2022.01) |
| ***H04N 23/63*** | (2023.01) |

(52) U.S. Cl.

CPC ............ *G06F 18/24* (2023.01); *G06T 1/0007* (2013.01); *G06V 10/751* (2022.01); *G06V 10/764* (2022.01); *G06V 10/82* (2022.01); *H04N 23/63* (2023.01); *G06N 5/022* (2013.01); *G06V 2201/09* (2022.01)

(58) Field of Classification Search

CPC ...... G06N 3/08; G06N 3/0464; G06N 3/0495; G06N 3/09; G06N 5/022; G06T 1/0007; G06V 10/751; G06V 10/764; G06V 10/82; G06V 2201/09; H04N 23/63

See application file for complete search history.

(56) References Cited

U.S. PATENT DOCUMENTS

| | | | |
|---|---|---|---|
| 5,996,023 | A | 11/1999 | Winter et al. |
| 6,038,295 | A | 3/2000 | Mattes |
| 6,158,044 | A | 12/2000 | Tibbetts |
| 6,167,435 | A | 12/2000 | Druckenmiller et al. |
| 6,205,432 | B1 | 3/2001 | Gabbard et al. |
| 6,310,694 | B1 | 10/2001 | Okimoto et al. |
| 6,323,761 | B1 | 11/2001 | Son |
| 6,481,625 | B2 | 11/2002 | Lucera et al. |
| 6,484,196 | B1 | 11/2002 | Maurille |
| 6,487,586 | B2 | 11/2002 | Ogilvie et al. |
| 6,665,531 | B1 | 12/2003 | Soderbacka et al. |
| 6,701,347 | B1 | 3/2004 | Ogilvie |
| 6,711,608 | B1 | 3/2004 | Ogilvie |
| 6,757,713 | B1 | 6/2004 | Ogilvie et al. |
| 6,963,659 | B2 | 11/2005 | Tumey et al. |
| 6,980,909 | B2 | 12/2005 | Root et al. |
| 7,124,164 | B1 | 10/2006 | Chemtob |
| 7,149,893 | B1 | 12/2006 | Leonard et al. |
| 7,173,651 | B1 | 2/2007 | Knowles |
| 7,243,163 | B1 | 7/2007 | Friend et al. |
| 7,278,168 | B1 | 10/2007 | Chaudhury et al. |
| 7,356,564 | B2 | 4/2008 | Hartselle et al. |
| 7,376,715 | B2 | 5/2008 | Cunningham et al. |
| 7,411,493 | B2 | 8/2008 | Smith |
| 7,478,402 | B2 | 1/2009 | Christensen et al. |
| 7,496,347 | B2 | 2/2009 | Puranik |
| 7,519,200 | B2 | 4/2009 | Gokturk et al. |
| 7,519,670 | B2 | 4/2009 | Hagale et al. |
| 7,535,890 | B2 | 5/2009 | Rojas |
| 7,607,096 | B2 | 10/2009 | Oreizy et al. |
| 7,703,140 | B2 | 4/2010 | Nath et al. |
| 7,753,269 | B2 | 7/2010 | Russell et al. |
| 7,912,896 | B2 | 3/2011 | Wolovitz et al. |
| 8,131,597 | B2 | 3/2012 | Hudetz |
| 8,155,329 | B1 | 4/2012 | Silaika |
| 8,170,957 | B2 | 5/2012 | Richard |
| 8,199,747 | B2 | 6/2012 | Rojas et al. |
| 8,214,443 | B2 | 7/2012 | Hamburg |
| 8,238,947 | B2 | 8/2012 | Lottin et al. |
| 8,244,593 | B2 | 8/2012 | Klinger et al. |
| 8,312,097 | B1 | 11/2012 | Siegel et al. |
| 8,332,475 | B2 | 12/2012 | Rosen et al. |
| 8,489,115 | B2 | 7/2013 | Rodriguez |
| 8,570,907 | B2 | 10/2013 | Garcia, Jr. et al. |
| 8,718,333 | B2 | 5/2014 | Wolf et al. |
| 8,724,622 | B2 | 5/2014 | Rojas |
| 8,745,058 | B1 | 6/2014 | Garcia-Barrio |
| 8,745,132 | B2 | 6/2014 | Obradovich |
| 8,793,274 | B2 | 7/2014 | Yu et al. |
| 8,819,035 | B2 | 8/2014 | Boetje |
| 8,850,490 | B1 | 9/2014 | Thomas et al. |
| 8,868,223 | B1 | 10/2014 | Sharifi |
| 8,874,677 | B2 | 10/2014 | Rosen et al. |
| 8,892,588 | B2 | 11/2014 | Bennett |
| 8,909,679 | B2 | 12/2014 | Root et al. |
| 8,909,714 | B2 | 12/2014 | Agarwal et al. |
| 8,909,725 | B1 | 12/2014 | Sehn |
| 8,913,285 | B1 | 12/2014 | Neubrand |
| 8,914,752 | B1 | 12/2014 | Spiegel |
| 8,924,890 | B2 | 12/2014 | Begeja et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,083,770 | B1 | 7/2015 | Drose et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,113,301 | B1 | 8/2015 | Spiegel et al. |
| 9,148,424 | B1 | 9/2015 | Yang |
| 9,191,776 | B2 | 11/2015 | Root et al. |
| 9,195,880 | B1 | 11/2015 | Levoy et al. |
| 9,204,252 | B2 | 12/2015 | Root |
| 9,225,805 | B2 | 12/2015 | Kujawa et al. |
| 9,225,897 | B1 | 12/2015 | Sehn et al. |
| 9,237,202 | B1 | 1/2016 | Sehn |
| 9,264,463 | B2 | 2/2016 | Rubinstein et al. |
| 9,264,485 | B1 | 2/2016 | Ranganathan et al. |
| 9,276,886 | B1 | 3/2016 | Samaranayake |
| 9,294,425 | B1 * | 3/2016 | Son ......................... H04L 51/18 |
| 9,385,983 | B1 | 7/2016 | Sehn |
| 9,396,354 | B1 | 7/2016 | Murphy et al. |
| 9,407,712 | B1 | 8/2016 | Sehn |
| 9,407,816 | B1 | 8/2016 | Sehn |
| 9,430,783 | B1 | 8/2016 | Sehn |
| 9,443,227 | B2 | 9/2016 | Evans et al. |
| 9,443,270 | B1 | 9/2016 | Friedman et al. |
| 9,482,882 | B1 | 11/2016 | Hanover et al. |
| 9,482,883 | B1 | 11/2016 | Meisenholder |
| 9,489,661 | B2 | 11/2016 | Evans et al. |
| 9,491,134 | B2 | 11/2016 | Rosen et al. |
| 9,532,171 | B2 | 12/2016 | Allen et al. |
| 9,537,811 | B2 | 1/2017 | Allen et al. |
| 9,560,006 | B2 | 1/2017 | Prado et al. |
| 9,628,950 | B1 | 4/2017 | Noeth et al. |
| 9,652,896 | B1 | 5/2017 | Jurgenson et al. |
| 9,659,244 | B2 | 5/2017 | Anderton et al. |
| 9,665,799 | B1 | 5/2017 | Munteanu et al. |
| 9,693,191 | B2 | 6/2017 | Sehn |
| 9,705,831 | B2 | 7/2017 | Spiegel |
| 9,742,713 | B2 | 8/2017 | Spiegel et al. |
| 9,785,796 | B1 | 10/2017 | Murphy et al. |
| 9,825,898 | B2 | 11/2017 | Sehn |
| 9,854,219 | B2 | 12/2017 | Sehn |
| 9,961,520 | B2 | 5/2018 | Brooks et al. |
| 10,157,333 | B1 | 12/2018 | Wang et al. |
| 10,540,378 | B1 | 1/2020 | Hsiao et al. |
| 10,540,575 | B1 | 1/2020 | Brody |
| 10,678,849 | B1 | 6/2020 | Ouimet et al. |
| 10,902,661 | B1 | 1/2021 | Mourkogiannis et al. |
| 10,909,425 | B1 | 2/2021 | Brody |
| 10,936,157 | B2 | 3/2021 | Voss et al. |
| 10,956,793 | B1 | 3/2021 | Wang et al. |
| 11,171,902 | B2 | 11/2021 | Grantham et al. |
| 11,218,433 | B2 | 1/2022 | Baldwin et al. |
| 11,270,491 | B2 | 3/2022 | Monroy-Hernández et al. |

(56) References Cited

U.S. PATENT DOCUMENTS 11,334,768 B1 5/2022 Brody
11,509,615 B2 11/2022 Baldwin et al.
11,563,702 B2 1/2023 Voss
11,593,980 B2 2/2023 Blackstock et al.
11,607,616 B2 3/2023 Blackstock et al.
11,616,745 B2 3/2023 Blackstock et al.
11,630,974 B2 4/2023 Ouimet et al.
11,822,600 B2 11/2023 Wang et al.
12,001,475 B2 6/2024 Brody
12,197,543 B2 1/2025 Brody
2002/0047868 A1 4/2002 Miyazawa
2002/0118195 A1 8/2002 Paetzold et al.
2002/0144154 A1 10/2002 Tomkow
2003/0052925 A1 3/2003 Daimon et al.
2003/0126215 A1 7/2003 Udell
2003/0217106 A1 11/2003 Adar et al.
2003/0224776 A1 12/2003 Meng
2004/0010516 A1 1/2004 Meng
2004/0203959 A1 10/2004 Coombes
2005/0060299 A1 3/2005 Filley et al.
2005/0097176 A1 5/2005 Schatz et al.
2005/0198128 A1 9/2005 Anderson
2005/0223066 A1 10/2005 Buchheit et al.
2006/0184538 A1 8/2006 Randall et al.
2006/0242239 A1 10/2006 Morishima et al.
2006/0249588 A1 11/2006 Walmsley et al.
2006/0253462 A1 11/2006 Gras
2006/0270419 A1 11/2006 Crowley et al.
2007/0038715 A1 2/2007 Collins et al.
2007/0064899 A1 3/2007 Boss et al.
2007/0073823 A1 3/2007 Cohen et al.
2007/0214216 A1 9/2007 Carrer et al.
2007/0233801 A1 10/2007 Eren et al.
2008/0002864 A1 1/2008 Das et al.
2008/0005105 A1 1/2008 Lawler et al.
2008/0055269 A1 3/2008 Lemay et al.
2008/0120409 A1 5/2008 Sun et al.
2008/0207176 A1 8/2008 Brackbill et al.
2008/0270938 A1 10/2008 Carlson
2008/0303833 A1 12/2008 Swift et al.
2008/0306826 A1 12/2008 Kramer et al.
2008/0313172 A1 12/2008 King et al.
2008/0313346 A1 12/2008 Kujawa et al.
2009/0012940 A1 1/2009 Ives et al.
2009/0016532 A1* 1/2009 Baldischweiler .... G06Q 20/341
713/193
2009/0042588 A1 2/2009 Lottin et al.
2009/0113305 A1 4/2009 Graif et al.
2009/0132453 A1 5/2009 Hangartner et al.
2009/0177665 A1 7/2009 Callery et al.
2010/0009700 A1 1/2010 Camp, Jr. et al.
2010/0082427 A1 4/2010 Burgener et al.
2010/0114876 A1 5/2010 Mandel et al.
2010/0131880 A1 5/2010 Lee et al.
2010/0185665 A1 7/2010 Horn et al.
2010/0214936 A1 8/2010 Ito et al.
2010/0293173 A1 11/2010 Chapin et al.
2010/0306193 A1 12/2010 Pereira et al.
2010/0306669 A1 12/2010 Della Pasqua
2011/0061028 A1 3/2011 Bachman et al.
2011/0099507 A1 4/2011 Nesladek et al.
2011/0145564 A1 6/2011 Moshir et al.
2011/0202598 A1 8/2011 Evans et al.
2011/0213845 A1 9/2011 Logan et al.
2011/0282508 A1 11/2011 Goutard et al.
2011/0282906 A1 11/2011 Wong
2011/0286586 A1 11/2011 Saylor et al.
2011/0295842 A1 12/2011 King et al.
2011/0320202 A1 12/2011 Kaufman
2011/0320373 A1 12/2011 Lee et al.
2012/0028659 A1 2/2012 Whitney et al.
2012/0078936 A1 3/2012 Kuo et al.
2012/0112995 A1 5/2012 Maeda
2012/0166472 A1 6/2012 Hoppenot et al.
2012/0184248 A1 7/2012 Speede
2012/0203761 A1 8/2012 Biran et al.
2012/0209921 A1 8/2012 Adafin et al.
2012/0209924 A1 8/2012 Evans et al.
2012/0254325 A1 10/2012 Majeti et al.
2012/0278692 A1 11/2012 Shi
2012/0294520 A1 11/2012 Mei et al.
2012/0304080 A1 11/2012 Wormald et al.
2013/0071093 A1 3/2013 Hanks et al.
2013/0073280 A1 3/2013 O'Neil et al.
2013/0073568 A1 3/2013 Federov et al.
2013/0073632 A1 3/2013 Fedorov et al.
2013/0073979 A1 3/2013 Shepherd et al.
2013/0073983 A1 3/2013 Rasmussen et al.
2013/0121571 A1 5/2013 Gokturk et al.
2013/0177296 A1 7/2013 Geisner et al.
2013/0185288 A1 7/2013 Nishiyama et al.
2013/0194301 A1 8/2013 Robbins et al.
2013/0201527 A1 8/2013 King et al.
2013/0226850 A1 8/2013 Hannuksela et al.
2013/0262935 A1 10/2013 Kutchuk et al.
2013/0279757 A1 10/2013 Kephart
2013/0279810 A1 10/2013 Li et al.
2013/0290443 A1 10/2013 Collins et al.
2013/0325605 A1 12/2013 Callaghan et al.
2014/0006020 A1 1/2014 Ko et al.
2014/0032682 A1 1/2014 Prado et al.
2014/0067945 A1 3/2014 Archibong et al.
2014/0075004 A1 3/2014 Van Dusen et al.
2014/0089815 A1 3/2014 Gildfind et al.
2014/0122787 A1 5/2014 Shalvi et al.
2014/0188894 A1 7/2014 Chechik et al.
2014/0201126 A1 7/2014 Zadeh et al.
2014/0201527 A1 7/2014 Krivorot
2014/0282096 A1 9/2014 Rubinstein et al.
2014/0323156 A1 10/2014 Gilberton et al.
2014/0325383 A1 10/2014 Brown et al.
2014/0337346 A1 11/2014 Barthel et al.
2014/0359024 A1 12/2014 Spiegel
2014/0359032 A1 12/2014 Spiegel et al.
2015/0010289 A1 1/2015 Lindblom
2015/0012525 A1 1/2015 Lindsay
2015/0033366 A1 1/2015 Guffrey et al.
2015/0052431 A1 2/2015 Zhu et al.
2015/0104103 A1 4/2015 Candelore
2015/0127710 A1 5/2015 Ady et al.
2015/0199082 A1 7/2015 Scholler et al.
2015/0227557 A1 8/2015 Holzschneider et al.
2015/0227602 A1 8/2015 Ramu et al.
2015/0254356 A1 9/2015 Skrenta et al.
2015/0286481 A1 10/2015 Walker
2015/0324395 A1 11/2015 Arnold et al.
2016/0026912 A1 1/2016 Falcon et al.
2016/0085773 A1 3/2016 Chang et al.
2016/0085863 A1 3/2016 Allen et al.
2016/0086670 A1 3/2016 Gross et al.
2016/0099901 A1 4/2016 Allen et al.
2016/0117574 A1* 4/2016 Mei ...................... G06F 16/583
382/159
2016/0147803 A1 5/2016 Noll et al.
2016/0147823 A1 5/2016 Noll et al.
2016/0150333 A1 5/2016 Goldstein et al.
2016/0180887 A1 6/2016 Sehn
2016/0182417 A1 6/2016 Cordes et al.
2016/0189009 A1 6/2016 Tran et al.
2016/0196350 A1 7/2016 Mau
2016/0275414 A1 9/2016 Towal
2016/0277419 A1 9/2016 Allen et al.
2016/0321708 A1 11/2016 Sehn
2016/0359778 A1 12/2016 Shi
2016/0359957 A1 12/2016 Laliberte
2016/0359987 A1 12/2016 Laliberte
2016/0365117 A1 12/2016 Boliek et al.
2016/0365122 A1 12/2016 Steinberg et al.
2017/0004383 A1 1/2017 Lin et al.
2017/0118306 A1 4/2017 Madhvanath et al.
2017/0161382 A1 6/2017 Ouimet et al.
2017/0206450 A1 7/2017 Umeda
2017/0263029 A1 9/2017 Yan et al.
2017/0287006 A1 10/2017 Azmoodeh et al.

(56) References Cited

U.S. PATENT DOCUMENTS

| | | | |
|---|---|---|---|
| 2017/0295250 | A1 | 10/2017 | Samaranayake et al. |
| 2017/0364660 | A1 | 12/2017 | Vigersky et al. |
| 2017/0374003 | A1 | 12/2017 | Allen et al. |
| 2017/0374508 | A1 | 12/2017 | Davis et al. |
| 2018/0032082 | A1 | 2/2018 | Shalev-Shwartz et al. |
| 2018/0341833 | A1 | 11/2018 | Bernard et al. |
| 2019/0146636 | A1 | 5/2019 | Kremer-davidson et al. |
| 2021/0019575 | A1 | 1/2021 | Ouimet et al. |
| 2021/0103779 | A1 | 4/2021 | Brody |
| 2021/0192693 | A1 | 6/2021 | Jepson et al. |
| 2021/0216830 | A1 | 7/2021 | Wang et al. |
| 2021/0217217 | A1 | 7/2021 | Bondich et al. |
| 2021/0306451 | A1 | 9/2021 | Heikkinen et al. |
| 2021/0405831 | A1 | 12/2021 | Mourkogiannis et al. |
| 2022/0101404 | A1 | 3/2022 | Boscolo et al. |
| 2022/0101417 | A1 | 3/2022 | Boscolo et al. |
| 2022/0101418 | A1 | 3/2022 | Dehtiarov et al. |
| 2022/0101566 | A1 | 3/2022 | Boscolo et al. |
| 2022/0129140 | A1 | 4/2022 | Blackstock et al. |
| 2022/0137761 | A1 | 5/2022 | Grantham et al. |
| 2022/0147236 | A1 | 5/2022 | Alvi et al. |
| 2022/0301231 | A1 | 9/2022 | Eirinberg et al. |
| 2022/0308722 | A1 | 9/2022 | Grantham et al. |
| 2022/0317861 | A1 | 10/2022 | Brody |
| 2022/0319075 | A1 | 10/2022 | Hu et al. |
| 2022/0383053 | A1 | 12/2022 | Brody |
| 2023/0222155 | A1 | 7/2023 | Ouimet et al. |
| 2024/0273136 | A1 | 8/2024 | Brody |
| 2025/0348533 | A1 | 11/2025 | Ouimet et al. |

FOREIGN PATENT DOCUMENTS

| | | | |
|---|---|---|---|
| EP | 3991120 | A1 | 5/2022 |
| WO | WO-2012000107 | A1 | 1/2012 |
| WO | WO-2013008251 | A2 | 1/2013 |
| WO | WO-2014194262 | A2 | 12/2014 |
| WO | WO-2015192026 | A1 | 12/2015 |
| WO | WO-2016054562 | A1 | 4/2016 |
| WO | WO-2016065131 | A1 | 4/2016 |
| WO | WO-2016/112299 | A1 | 7/2016 |
| WO | WO-2016179166 | A1 | 11/2016 |
| WO | WO-2016179235 | A1 | 11/2016 |
| WO | WO-2017100476 | A1 | 6/2017 |
| WO | WO-2017176739 | A1 | 10/2017 |
| WO | WO-2017176992 | A1 | 10/2017 |
| WO | WO-2018004731 | A1 | 1/2018 |
| WO | WO-2018005644 | A1 | 1/2018 |
| WO | WO-2021263210 | A1 | 12/2021 |
| WO | WO-2022147167 | A1 | 7/2022 |

OTHER PUBLICATIONS

"U.S. Appl. No. 15/008,885, Final Office Action mailed Oct. 16, 2023", 59 pgs.

"U.S. Appl. No. 15/008,885, Response filed Sep. 19, 2023 to Non Final Office Action mailed May 19, 2023", 12 pgs.

"U.S. Appl. No. 15/008,885, Response filed Dec. 18, 2023 to Final Office Action mailed Oct. 16, 2023", 14 pgs.

"U.S. Appl. No. 15/008,956, Examiner Interview Summary mailed Apr. 10, 2023", 2 pgs.

"U.S. Appl. No. 15/008,956, Final Office Action mailed Apr. 16, 2021", 36 pgs.

"U.S. Appl. No. 15/008,956, Final Office Action mailed Jul. 29, 2022", 51 pgs.

"U.S. Appl. No. 15/008,956, Final Office Action mailed Aug. 21, 2023", 19 pgs.

"U.S. Appl. No. 15/008,956, Non Final Office Action mailed Oct. 4, 2021", 45 pgs.

"U.S. Appl. No. 15/008,956, Non Final Office Action mailed Dec. 8, 2022", 22 pgs.

"U.S. Appl. No. 15/008,956, Response filed Feb. 22, 2021 to Non Final Office Action mailed Aug. 21, 2020", 10 pgs.

"U.S. Appl. No. 15/008,956, Response filed Apr. 4, 2022 to Non Final Office Action mailed Oct. 4, 2021", 13 pgs.

"U.S. Appl. No. 15/008,956, Response filed May 8, 2023 to Non Final Office Action mailed Dec. 8, 2022", 12 pgs.

"U.S. Appl. No. 15/008,956, Response filed Sep. 16, 2021 to Final Office Action mailed Apr. 16, 2021", 11 pgs.

"U.S. Appl. No. 15/008,956, Response filed Nov. 18, 2022 to Final Office Action mailed Jul. 29, 2022", 14 pgs.

"U.S. Appl. No. 15/009,402, Final Office Action mailed Jan. 27, 2022", 29 pgs.

"U.S. Appl. No. 15/009,402, Final Office Action mailed Dec. 22, 2022", 34 pgs.

"U.S. Appl. No. 15/009,402, Non Final Office Action mailed May 23, 2023", 36 pgs.

"U.S. Appl. No. 15/009,402, Non Final Office Action mailed Jul. 9, 2021", 25 pgs.

"U.S. Appl. No. 15/009,402, Non Final Office Action mailed Jul. 21, 2022", 33 pgs.

"U.S. Appl. No. 15/009,402, Response filed Apr. 24, 2023 to Final Office Action mailed Dec. 22, 2022", 15 pgs.

"U.S. Appl. No. 15/009,402, Response filed Apr. 30, 2021 to Final Office Action mailed Dec. 30, 2020", 11 pgs.

"U.S. Appl. No. 15/009,402, Response filed Jun. 27, 2022 to Final Office Action mailed Jan. 27, 2022", 11 pgs.

"U.S. Appl. No. 15/009,402, Response filed Nov. 21, 2022 to Non Final Office Action mailed Jul. 21, 2022", 12 pgs.

"U.S. Appl. No. 15/009,402, Response filed Dec. 9, 2021 to Non Final Office Action mailed Jul. 9, 2021", 11 pgs.

"U.S. Appl. No. 17/127,460, Response filed Jul. 6, 2023 to Non Final Office Action mailed Apr. 6, 2023", 9 pgs.

"U.S. Appl. No. 17/248,386, PTO Response to Rule 312 Communication mailed Oct. 20, 2023", 2 pgs.

"U.S. Appl. No. 18/122,328, Non Final Office Action mailed Sep. 28, 2023", 28 pgs.

U.S. Appl. No. 15/265,672 U.S. Pat. No. 10,678,849, filed Sep. 14, 2016, Prioritized Device Actions Triggered by Device Scan Data.

U.S. Appl. No. 15/929,483 U.S. Pat. No. 11,630,974, filed May 5, 2020, Prioritized Device Actions Triggered by Device Scan Data.

U.S. Appl. No. 18/122,328, filed Mar. 16, 2023, Prioritized Device Actions Triggered by Device Scan Data.

U.S. Appl. No. 15/008,885, filed Jan. 28, 2016, System to Correlate Video Data and Contextual Data.

U.S. Appl. No. 15/640,106 U.S. Pat. No. 10,540,575, filed Jun. 30, 2017, Ephemeral Content Managemet.

U.S. Appl. No. 16/676,089 U.S. Pat. No. 11,334,768, filed Nov. 6, 2019, Ephemeral Content Management.

U.S. Appl. No. 17/744,472, filed May 13, 2022, Ephemeral Content Management.

U.S. Appl. No. 15/640,124 U.S. Pat. No. 10,909,425, filed Jun. 30, 2017, Systems and Methods for Mobile Image Search.

U.S. Appl. No. 17/127,460, filed Dec. 18, 2020, Mobile Image Search System.

U.S. Appl. No. 15/247,697 U.S. Pat. No. 10,157,333, filed Aug. 25, 2016, Systems and Methods for Content Tagging.

U.S. Appl. No. 16/192,419 U.S. Pat. No. 10,956,793, filed Nov. 15, 2018, Content Tagging.

U.S. Appl. No. 17/248,386, filed Jan. 22, 2021, Content Tragging.

"U.S. Appl. No. 15/008,885, Advisory Action mailed Apr. 21, 2023", 4 pgs.

"U.S. Appl. No. 15/008,885, Final Office Action mailed Feb. 3, 2023", 54 pgs.

"U.S. Appl. No. 15/008,885, Final Office Action mailed Feb. 10, 2021", 47 pgs.

"U.S. Appl. No. 15/008,885, Final Office Action mailed Mar. 6, 2019", 32 pgs.

"U.S. Appl. No. 15/008,885, Final Office Action mailed Mar. 21, 2022", 49 pgs.

"U.S. Appl. No. 15/008,885, Final Office Action mailed Apr. 24, 2020", 38 pgs.

"U.S. Appl. No. 15/008,885, Non Final Office Action mailed May 19, 2023", 56 pgs.

"U.S. Appl. No. 15/008,885, Non Final Office Action mailed Jul. 29, 2021", 49 pgs.

(56) References Cited

OTHER PUBLICATIONS

"U.S. Appl. No. 15/008,885, Non Final Office Action mailed Aug. 6, 2018", 35 pgs.
"U.S. Appl. No. 15/008,885, Non Final Office Action mailed Aug. 6, 2020", 40 pgs.
"U.S. Appl. No. 15/008,885, Non Final Office Action mailed Sep. 8, 2022", 52 pgs.
"U.S. Appl. No. 15/008,885, Non Final Office Action mailed Oct. 2, 2019", 38 pgs.
"U.S. Appl. No. 15/008,885, Response filed Jan. 6, 2021 to Non Final Office Action mailed Aug. 6, 2020", 12 pgs.
"U.S. Appl. No. 15/008,885, Response filed Feb. 3, 2020 to Non Final Office Action mailed Oct. 2, 2019", 12 pgs.
"U.S. Appl. No. 15/008,885, Response filed Apr. 3, 2023 to Final Office Action mailed Feb. 3, 2023", 13 pgs.
"U.S. Appl. No. 15/008,885, Response filed May 2, 2023 to Advisory Action mailed Apr. 21, 2023", 13 pgs.
"U.S. Appl. No. 15/008,885, Response filed Jul. 12, 2021 to Final Office Action mailed Feb. 10, 2021", 14 pgs.
"U.S. Appl. No. 15/008,885, Response filed Jul. 24, 2020 to Final Office Action mailed Apr. 24, 2020", 12 pgs.
"U.S. Appl. No. 15/008,885, Response filed Aug. 22, 2022 to Final Office Action mailed Mar. 21, 2022", 11 pgs.
"U.S. Appl. No. 15/008,885, Response filed Jan. 7, 2019 to Non Final Office Action mailed Aug. 6, 2018", 10 pgs.
"U.S. Appl. No. 15/008,885, Response filed Nov. 29, 2021 to Non Final Office Action mailed Jul. 29, 2021", 14 pgs.
"U.S. Appl. No. 15/008,885, Response filed Dec. 8, 2022 to Non Final Office Action mailed Sep. 8, 2022", 12 pgs.
"U.S. Appl. No. 15/008,885, Response filed Sep. 6, 2019 to Final Office Action mailed Mar. 6, 2019", 12 pgs.
"U.S. Appl. No. 15/008,956, Final Office Action mailed Mar. 5, 2019", 21 pgs.
"U.S. Appl. No. 15/008,956, Final Office Action mailed May 1, 2020", 27 pgs.
"U.S. Appl. No. 15/008,956, Non Final Office Action mailed Aug. 6, 2018", 22 pgs.
"U.S. Appl. No. 15/008,956, Non Final Office Action mailed Aug. 21, 2020", 30 pgs.
"U.S. Appl. No. 15/008,956, Non Final Office Action mailed Oct. 4, 2019", 21 pgs.
"U.S. Appl. No. 15/008,956, Response filed Jan. 8, 2019 to Non Final Office Action mailed Aug. 6, 2018", 11 pgs.
"U.S. Appl. No. 15/008,956, Response filed Feb. 4, 2020 to Non Final Office Action mailed Oct. 4, 2019", 11 pgs.
"U.S. Appl. No. 15/008,956, Response filed Aug. 3, 2020 to Final Office Action mailed May 1, 2020", 10 pgs.
"U.S. Appl. No. 15/008,956, Response filed Sep. 5, 2019 to Final Office Action mailed Mar. 5, 2019", 9 pgs.
"U.S. Appl. No. 15/009,402, Final Office Action mailed Feb. 28, 2020", 22 pgs.
"U.S. Appl. No. 15/009,402, Final Office Action mailed Mar. 22, 2019", 17 pgs.
"U.S. Appl. No. 15/009,402, Final Office Action mailed Dec. 30, 2020", 30 pgs.
"U.S. Appl. No. 15/009,402, Non Final Office Action mailed Aug. 5, 2020", 23 pgs.
"U.S. Appl. No. 15/009,402, Non Final Office Action mailed Aug. 16, 2018", 18 pgs.
"U.S. Appl. No. 15/009,402, Non Final Office Action mailed Oct. 3, 2019", 19 pgs.
"U.S. Appl. No. 15/009,402, Response filed Jan. 16, 2019 to Non Final Office Action mailed Aug. 16, 2018", 7 pgs.
"U.S. Appl. No. 15/009,402, Response filed Feb. 3, 2020 to Non Final Office Action mailed Oct. 3, 2019", 11 pgs.
"U.S. Appl. No. 15/009,402, Response filed Jun. 22, 2020 to Final Office Action mailed Feb. 28, 2020", 10 pgs.
"U.S. Appl. No. 15/009,402, Response filed Sep. 21, 2019 to Final Office Action mailed Mar. 22, 2019", 11 pgs.
"U.S. Appl. No. 15/009,402, Response filed Nov. 5, 2020 to Non Final Office Action mailed Aug. 5, 2020", 11 pgs.
"U.S. Appl. No. 15/247,697, Corrected Notice of Allowability mailed Sep. 21, 2018", 13 pgs.
"U.S. Appl. No. 15/247,697, Examiner Interview Summary mailed Aug. 8, 2018", 1 pg.
"U.S. Appl. No. 15/247,697, Notice of Allowance mailed Aug. 8, 2018", 25 pgs.
"U.S. Appl. No. 15/265,672, Non Final Office Action mailed Jan. 14, 2019", 10 pgs.
"U.S. Appl. No. 15/265,672, Non Final Office Action mailed Jul. 15, 2019", 9 pgs.
"U.S. Appl. No. 15/265,672, Notice of Allowance mailed Jan. 28, 2020", 10 pgs.
"U.S. Appl. No. 15/265,672, Response filed Apr. 15, 2019 to Non Final Office Action mailed Jan. 14, 2019", 12 pgs.
"U.S. Appl. No. 15/265,672, Response filed Oct. 14, 2019 to Non-Final Office Action mailed Jul. 15, 2019", 11 pgs.
"U.S. Appl. No. 15/640,106, Notice of Allowance mailed Jul. 30, 2019", 8 pgs.
"U.S. Appl. No. 15/640,124, Advisory Action mailed Mar. 19, 2020", 2 pgs.
"U.S. Appl. No. 15/640,124, Final Office Action mailed Dec. 31, 2019", 16 pgs.
"U.S. Appl. No. 15/640,124, Non Final Office Action mailed Apr. 30, 2020", 16 pgs.
"U.S. Appl. No. 15/640,124, Non Final Office Action mailed May 17, 2019", 12 pgs.
"U.S. Appl. No. 15/640,124, Notice of Allowance mailed Sep. 24, 2020", 8 pgs.
"U.S. Appl. No. 15/640,124, Response filed Mar. 2, 2020 to Final Office Action mailed Dec. 31, 2019", 13 pgs.
"U.S. Appl. No. 15/640,124, Response filed Jun. 30, 2020 to Non Final Office Action mailed Apr. 30, 2020", 12 pgs.
"U.S. Appl. No. 15/640,124, Response filed Sep. 17, 2019 to Non-Final Office Action mailed May 17, 2019", 10 pgs.
"U.S. Appl. No. 15/929,483, Examiner Interview Summary mailed Jun. 6, 2022", 3 pgs.
"U.S. Appl. No. 15/929,483, Final Office Action mailed Sep. 9, 2022", 14 pgs.
"U.S. Appl. No. 15/929,483, Non Final Office Action mailed Jan. 21, 2022", 18 pgs.
"U.S. Appl. No. 15/929,483, Notice of Allowance mailed Dec. 7, 2022", 10 pgs.
"U.S. Appl. No. 15/929,483, Preliminary Amendment filed Oct. 13, 2020", 7 pgs.
"U.S. Appl. No. 15/929,483, Response filed Jun. 21, 202 to Non Final Office Action mailed Jan. 21, 2022", 12 pgs.
"U.S. Appl. No. 15/929,483, Response filed Nov. 4, 2022 to Final Office Action mailed Sep. 9, 2022", 8 pgs.
"U.S. Appl. No. 16/192,419, Advisory Action mailed Feb. 27, 2020", 3 pgs.
"U.S. Appl. No. 16/192,419, Corrected Notice of Allowability mailed Feb. 10, 2021", 1 pg.
"U.S. Appl. No. 16/192,419, Examiner Interview Summary mailed Feb. 13, 2020", 4 pgs.
"U.S. Appl. No. 16/192,419, Final Office Action mailed Dec. 2, 2019", 29 pgs.
"U.S. Appl. No. 16/192,419, Non Final Office Action mailed Apr. 9, 2019", 26 pgs.
"U.S. Appl. No. 16/192,419, Non Final Office Action mailed Apr. 23, 2020", 27 pgs.
"U.S. Appl. No. 16/192,419, Notice of Allowance mailed Oct. 21, 2020", 10 pgs.
"U.S. Appl. No. 16/192,419, Response filed Feb. 3, 2020 to Final Office Action mailed Dec. 2, 2019", 13 pgs.
"U.S. Appl. No. 16/192,419, Response filed Sep. 23, 2020 to Non Final Office Action mailed Apr. 23, 2020", 11 pgs.
"U.S. Appl. No. 16/192,419, Response filed Aug. 8, 2019 to Non-Final Office Action mailed Apr. 9, 2019", 12 pgs.
"U.S. Appl. No. 16/192,419, Supplemental Notice of Allowability mailed Feb. 24, 2021", 2 pgs.

(56) References Cited

OTHER PUBLICATIONS

"U.S. Appl. No. 16/676,089, Examiner Interview Summary mailed Jul. 16, 2021", 2 pgs.
"U.S. Appl. No. 16/676,089, Non Final Office Action mailed Jul. 26, 2021", 8 pgs.
"U.S. Appl. No. 16/676,089, Notice of Allowance mailed Jan. 12, 2022", 8 pgs.
"U.S. Appl. No. 16/676,089, Response filed Jun. 30, 2021 to Restriction Requirement mailed Apr. 30, 2021", 2 pgs.
"U.S. Appl. No. 16/676,089, Response filed Oct. 26, 2021 to Non Final Office Action mailed Jul. 26, 2021", 8 pgs.
"U.S. Appl. No. 16/676,089, Restriction Requirement mailed Apr. 30, 2021", 6 pgs.
"U.S. Appl. No. 17/127,460, Non Final Office Action mailed Apr. 6, 2023", 6 pgs.
"U.S. Appl. No. 17/248,386, Amendment Under 37 C.F.R. § 1.312 Filed Oct. 6, 2023", 6 pgs.
"U.S. Appl. No. 17/248,386, Notice of Allowability mailed Sep. 7, 2023", 7 pgs.
"U.S. Appl. No. 17/248,386, Notice of Allowance mailed Jul. 7, 2023", 10 pgs.
"U.S. Appl. No. 17/248,386, Preliminary Amendment filed Apr. 5, 2021", 7 pgs.
"U.S. Appl. No. 17/744,472, Preliminary Amendment filed Sep. 21, 2022", 7 pgs.
"How to Search by Image on Google", Google, [Online]. Retrieved from the Internet: <URL: http://www.wikihow.com/Search-by-Image-on-Google, (Accessed Nov. 17, 2015), 3 pgs.
"International Application Serial No. PCT/US2016/065660, International Preliminary Report on Patentability mailed Jun. 21, 2018", 13 pgs.
"International Application Serial No. PCT/US2016/065660, International Search Report mailed May 2, 2017", 7 pgs.
"International Application Serial No. PCT/US2016/065660, Invitation to Pay Add'l Fees and Partial Search Rpt mailed Mar. 3, 2017", 6 pgs.
"International Application Serial No. PCT/US2016/065660, Written Opinion mailed May 2, 2017", 13 pgs.
Castelluccia, Claude, et al., "EphPub: Toward robust Ephemeral Publishing", 19th IEEE International Conference on Network Protocols (ICNP), (Oct. 17, 2011), 18 pgs.
Chetlur, Sharan, et al., "cuDNN: Efficient Primitives for Deep Learning", arXiv:1410.0759v3, (Dec. 18, 2014), 9 pgs.
Fajman, "An Extensible Message Format for Message Disposition Notifications", Request for Comments: 2298, National Institutes of Health, (Mar. 1998), 28 pgs.
Girgensohn, Andreas, et al., "Leveraging Face Recognition Technology to Find and Organize Photos", Proc. of the 6th ACM SIGMM Intl. Workshop on Multimedia Information Retrieval, (Oct. 2004), 8 pgs.
Huynh, Loc N, et al., "DeepSense: A GPU-based Deep Convolutional Neural Network Framework on Commodity Mobile Devices", Proc. of the ACM Workshop on Wearable Systems and Applications, (2016), 6 pgs.
Leyden, John, "This SMS will self-destruct in 40 seconds", [Online] Retrieved from the Internet: < URL: http://www.theregister.co.uk/2005/12/12/stealthtext/>, (Dec. 12, 2005), 1 pg.
Li, H., et al., "Interactive Multimodal Visual Search on Mobile Device", IEEE Transactions on Multimedia, vol. 15, No. 3, (Apr. 2013), 594-607.
Long, Jonathan, et al., "Fully Convolutional Networks for Semantic Segmentation", IEEE Conference on Computer Vision and Pattern Recognition (CVPR), Boston, MA, [Online] Retrieved from the internet: <https://openaccess.thecvf.com/content_cvpr_2015/papers/Long_Fully_Convolutional_Networks_2015_CVPR_paper.pdf>, (Jun. 2015), 10 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
Vallet, Alexis, et al., "A Multi-Label Convolutional Neural Network for Automatic Image Annotation", Journal of Information Processing, vol. 23, No. 6, (Nov. 2015), 10 pgs.
"U.S. Appl. No. 15/008,885, Advisory Action mailed Jan. 18, 2024", 3 pgs.
"U.S. Appl. No. 15/008,885, Corrected Notice of Allowability mailed Jun. 12, 2025", 2 pgs.
"U.S. Appl. No. 15/008,885, Examiner Interview Summary mailed Jan. 27, 2025", 2 pgs.
"U.S. Appl. No. 15/008,885, Final Office Action mailed Oct. 15, 2024", 58 pgs.
"U.S. Appl. No. 15/008,885, Non Final Office Action mailed Apr. 25, 2024", 58 pgs.
"U.S. Appl. No. 15/008,885, Notice of Allowance mailed Mar. 14, 2025", 17 pgs.
"U.S. Appl. No. 15/008,885, Response filed Feb. 17, 2025 to Final Office Action mailed Oct. 15, 2024", 13 pgs.
"U.S. Appl. No. 15/008,885, Response filed Apr. 16, 2024 to Advisory Action mailed Jan. 18, 2024", 14 pgs.
"U.S. Appl. No. 15/008,885, Response filed Sep. 25, 2024 to Non Final Office Action mailed Apr. 25, 2024", 12 pgs.
"U.S. Appl. No. 17/127,460, Notice of Allowance mailed Jan. 24, 2024", 8 pgs.
"U.S. Appl. No. 17/127,460, Supplemental Notice of Allowability mailed Feb. 13, 2024", 2 pgs.
"U.S. Appl. No. 17/744,472, Notice of Allowance mailed Oct. 18, 2024", 12 pgs.
"U.S. Appl. No. 18/122,328, Examiner Interview Summary mailed Dec. 2, 2024", 3 pgs.
"U.S. Appl. No. 18/122,328, Final Office Action mailed Mar. 20, 2025", 21 pgs.
"U.S. Appl. No. 18/122,328, Final Office Action mailed Apr. 16, 2024", 31 pgs.
"U.S. Appl. No. 18/122,328, Non Final Office Action mailed Aug. 1, 2024", 31 pgs.
"U.S. Appl. No. 18/122,328, Notice of Allowance mailed Apr. 15, 2025", 12 pgs.
"U.S. Appl. No. 18/122,328, Response filed Jan. 25, 2024 to Non Final Office Action mailed Sep. 28, 2023", 10 pgs.
"U.S. Appl. No. 18/122,328, Response filed Mar. 26, 2025 to Final Office Action mailed Mar. 20, 2025", 9 pgs.
"U.S. Appl. No. 18/122,328, Response filed Jul. 16, 2024 to Final Office Action mailed Apr. 16, 2024", 12 pgs.
"U.S. Appl. No. 18/122,328, Response filed Dec. 2, 2024 to Non Final Office Action mailed Aug. 1, 2024", 15 pgs.
"U.S. Appl. No. 18/643,980, Non Final Office Action mailed Feb. 27, 2026", 12 pgs.

* cited by examiner

| |
|---|
| MSG_ID 402 |
| MSG_TEXT 404 |
| MSG_IMAGE 406 |
| MSG_VID 408 |
| MSG_AUD 410 |
| MSG_ANNOT 412 |
| MSG_DUR 414 |
| MSG_LOCATION 416 |
| MSG_STRY_ID 418 |
| MSG_TAG 420 |
| MSG_SENDER_ID 422 |
| MSG_RECEIVER_ID 424 |

IMAGE TABLE 308

VIDEO TABLE 310

ANNOTATION TABLE 312

STORY TABLE 306

ENTITY TABLE 302

CONTENT TAGGING

CLAIM OF PRIORITY

This application is a continuation of and claims the benefit of priority of U.S. patent application Ser. No. 17/248,386, filed on Jan. 22, 2021, which is a continuation of and claims the benefit of priority of U.S. patent application Ser. No. 16/192,419, filed on Nov. 15, 2018, which is a continuation of and claims the benefit of priority of U.S. patent application Ser. No. 15/247,697, filed on Aug. 25, 2016, which claims the benefit of priority of U.S. Provisional Application Ser. No. 62/218,965, filed on Sep. 15, 2015 and U.S. Provisional Application Ser. No. 62/358,461, filed on Jul. 5, 2016, each of which are incorporated herein by reference in their entireties.

TECHNICAL FIELD

Embodiments of the present disclosure relate generally to resource limited computing systems and image processing to tag or label content using such resource limited computing systems. Some embodiments particularly related to deep convolutional neural networks used for image tagging.

DETAILED DESCRIPTION

Figure 1:
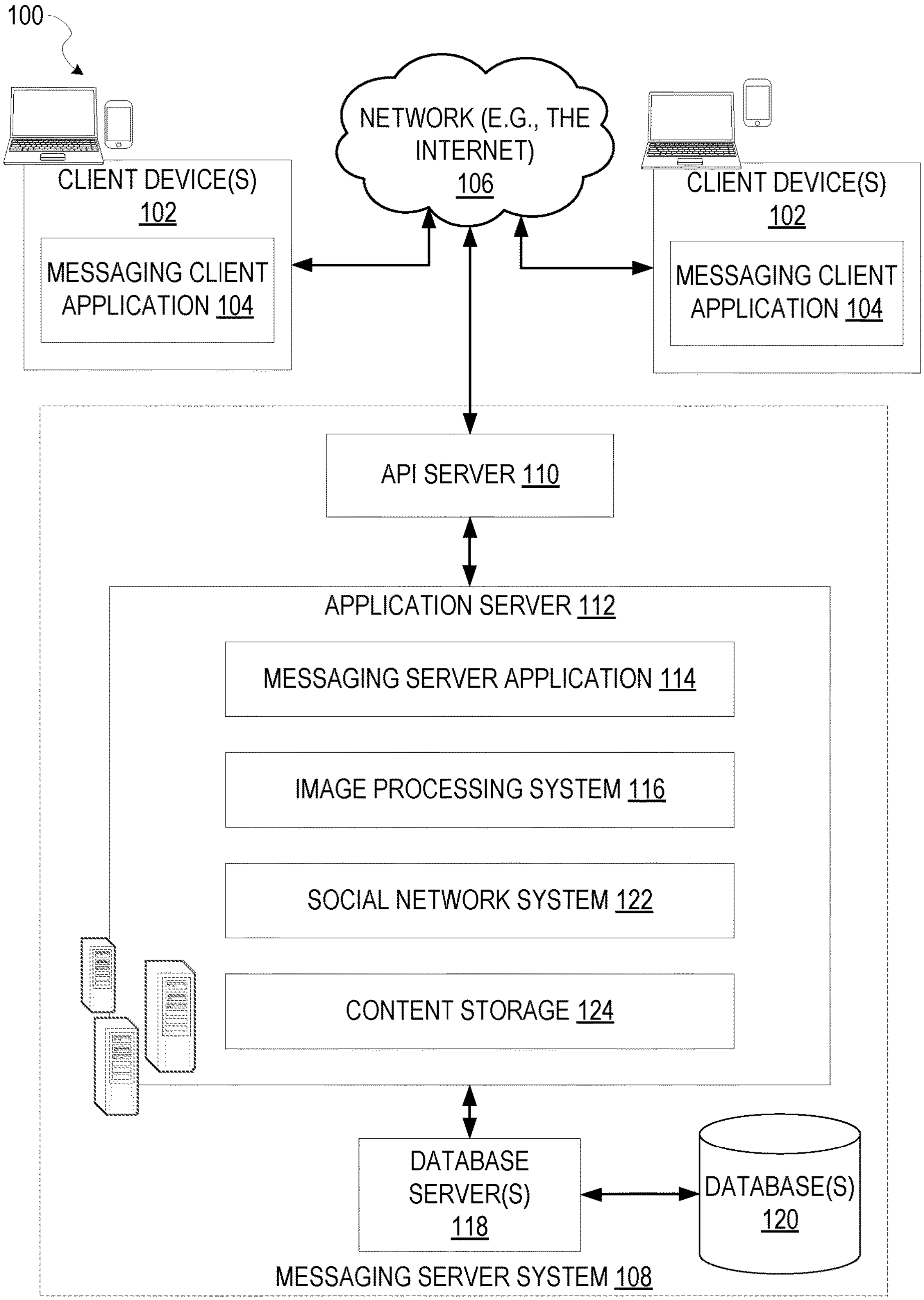
FIG. 1 is a block diagram showing an example messaging system for exchanging data (e.g., messages and associated content) over a network in accordance with some embodiments.

Embodiments described herein relate to resource limited computing systems and image processing to tag or label content for visual search on such resource limited computing systems. Some embodiments particularly related to deep convolutional neural networks used for image tagging to enable visual search. Some embodiments operate in an ephemeral messaging system with an integrated content storage system for optional non-ephemeral storage of content.

Visual search refers to systems that allow users to input text in order to identify images associated with the text. For example, a text input of "beach" would result in a visual search result of images including a beach in at least a portion of the images. Traditional operations for enabling such visual search include significant computing resources to analyze images to generate "tags" or text metadata associated with an image based on object recognition or other analysis tools to identify the content of the image. Because of such resource demands, network enabled mobile devices (e.g. smartphones or tablets) typically transfer some or all of the image processing to networked cloud computing resources. Such cloud based techniques, however, have multiple drawbacks. These include difficulty scaling and costs for computational and memory resources, particularly in an environment serving millions of users. Additionally, network resources to transfer images are also costly. Further still, transferring images over a network involves privacy concerns, where users may prefer not to generate and store copies of their images in a cloud environment.

Embodiments described herein provide technical solutions to the technical resource limitation problems presented above with particular processor implemented object recognition operations. The embodiments described herein allow the mobile device to process and tag images on the mobile device under resource constrained conditions in a way not possible with previously known systems. In addition to enabling object recognition on mobile devices, additional benefits are provided by making content easily searchable in environments without network access, and by providing security and privacy by allowing search without making content accessible to a network. Thus, as described below, the embodiments improve the operation of mobile devices by enabling local tagging and visual search. Particular embodiments provide this improvement using deep convolutional neural networks (DCNN), knowledge graph(s), natural language processing, content metadata, or various combinations of the above.

"Content", as described herein, refers to one or more images or video clips (e.g. snaps) captured by an electronic device, as well as any associated metadata descriptions and graphics or animation added to the image or video clip. This includes metadata generated by an electronic device capturing an image or video, as well as metadata that may be associated later by other devices. A "piece of content" refers to an individual image or video clip captured by a client device with any changes made to the image or video clip (e.g. transformations, filters, added text, etc.). Individual pieces of content may have multimedia elements, including drawings, text, animations, emoji, or other such elements added along with image or video clip elements. Content captured by an image sensor of a client device may be sent, along with any added multimedia elements from a user, via a network to other client devices as part of a social sharing network. Individual pieces of content may have time limits or associated display times, which are within a display threshold set by a system. For example, an embodiment system may limit video clips to 10 seconds or less, and may allow users to select display times less than 10 seconds for image content.

A "content message" as referred to herein refers to the communication of content between one or more users via the system. Content may also be sent from a client device to a server system to be shared generally with other system users. Some embodiments limit content messages to images or video clips captured using an interface that does not allow the content to be stored and sent later, but instead uses an associated content message with a single piece of content and any added multimedia to be sent before any other action is taken on the device. Embodiments described herein relate to methods of grouping such content into content collections (e.g., stories.) In various systems, content messages may be sent from one individual user to another individual user, as, for example, an ephemeral message in addition to the ability to send content messages to a server computer system for inclusion in various content collections.

A "content collection" as described herein is an ordered set of content (e.g. a story). The individual pieces of content that make up a particular content collection may be related in a variety of different ways. For example, in some embodiments, a content collection includes all pieces of content marked as public that are sent to a server system from a particular user within a certain time frame (e.g., within the past 24 hours). Access to such a content collection can be limited to certain other users (e.g., friends) identified by the user that generates the content for the collection. In some other embodiments, content collections include pieces of content from different users that are related by time, location, content, or other metadata. In some embodiments, content collections are referred to as stories. A story or content collection may be generated from pieces of content that are related in a variety of different ways, as is described in more detail throughout this document.

"Ephemeral" content refers to content with an associated trigger for deletion. In some embodiments, for example, a content capture interface (e.g. such as the interface illustrated in FIG. 8) enables the capture of images or video clips. An ephemeral messaging interface allows for the captured content to be communicated to other users as part of an ephemeral message that will be deleted after viewing, or to be sent to a "live" content collection that is available for viewing to by other accounts in the system for a limited period of time. The ephemeral content is not stored on the device that captured the content unless a user elects to store the content. The application for the ephemeral messaging system thus defaults to deletion of the content unless the user elects to store the content in local application storage.

Thus, as described herein, some embodiments include the operations of an ephemeral messaging application operating on a client device (e.g. a smartphone) as part of an ephemeral messaging system that includes an operation for non-ephemeral storage of content. Various embodiments therefore include local tagging and search on a device for images captured by the device, as well as similar tagging and search for non-ephemeral images received through a messaging application.

FIG. 1 is a block diagram showing an example messaging system 100 for exchanging data (e.g., messages and associated content) over a network. The messaging system 100 includes multiple client devices 102, each of which hosts a number of applications including an ephemeral messaging client application 104. Each messaging client application 104 is communicatively coupled to other instances of the messaging client application 104 and a messaging server system 108 via a network 106 (e.g., the Internet).

Ephemeral messaging client application 104 operates as described below to enable communication of ephemeral content messages between devices associated with user accounts. In embodiments described herein, ephemeral messaging client application 104 also enables indexing and storage of content initially generated for ephemeral messaging in both a non-private format that is synchronized with content storage 124 on a server, as well as private content that may or may not be synchronized with content storage 124 depending on the level of security selected by a user of a client device 102.

In addition to content stored on a client device 102 using application 104, content may also be stored using an application directly associated with the camera on the device (e.g. camera roll storage) that is separate from the storage for application 104.

As part of operation of an ephemeral messaging client application 104, various tabs or user interface screens are available. One such screen is a content collection (e.g. stories) screen that includes icons for various stories, including a live story (e.g. my story) for a user account of the specific client device; stories for content sources such as magazines, newspapers, television networks, etc.; stories for locations such as particular cities, universities, etc.; and stories for related accounts that are available to the account associated with the device displaying the interface (e.g. stories from friends).

Additionally, a user interface for content within application 104 includes a display for content stored within application 104. This may include a tab for all content, a separate tab for individual images and videos, and a tab for content collection. In some embodiments, such a user interface may present an individual presentation for a story which represents a number of images and/or videos. One embodiment uses a circular shape with at least a portion of an image from a piece of content displayed within the circle. The piece of content represented within the circle may change over time, such that each piece of content associated with a content collection is presented for a period of time. In one embodiment, part of an image from each piece of content is presented for one second, cycling through each piece of content in order and returning to the beginning after each piece of content in the story has been represented. For example, in a content collection with 15 pieces of content including images and videos, each piece of content has an associated image portion displayed within the circle for 1 second, with the pattern repeating after 15 seconds. On a device with multiple content collections, multiple such circles with rotating internal image content are displayed simultaneously within the interface on a device 102. In an "all" display, pieces of content may be displayed within rectangular areas next to circular areas for stories. This may involve various patterns of circles and squares as described herein.

As individual pieces of content are stored within the application storage, the user interface allows these individual pieces of content to be accessed within application 104. This may involve automatic ordering based on a generation time for each piece of content, or any user selected ordering. Individual pieces of content and content collections can then be presented together or separately in the user interface of application 104. As described below, image tagging operations may be performed by the mobile device on such content to enable visual searching of content collections or of any content within the application storage using the various embodiments described herein. This imaging tagging is performed on the mobile device without transferring images to networked resources to assist with the image processing.

Additionally, in some embodiments, the separate camera roll storage may be accessed or presented within application 104. In some embodiments, application 104 accesses separate storage of client device 102 to identify content, and presents the content within the camera roll storage within a portion of application 104 interface. In some embodiments, this camera roll storage is not synchronized with server content 124. Content that is moved or copied from camera roll storage to application storage is synchronized and backed up to content storage 124. If content from camera roll storage is used for a content collection or is marked private within application 104, the content is automatically moved to application storage. Depending on privacy settings, the content may be encrypted and/or deleted from camera roll storage after it is placed in application 104 storage. Such content may be automatically processed to generate tags and to make the content available for visual search within the application as it is moved from camera roll storage to application storage.

When content is generated using the content capture interface of application 104, metadata is stored with the content, such as capture time, capture location, available filters/overlays, temperature, device speed, user added drawings, or other such system based metadata. In some embodiments, this information and the availability of certain overlay filters is stored, and the content is editable within application storage based on this metadata. For example, if application 104 allows ephemeral content to be edited to add an overlay filter for a location only when the device is within the location, then in some embodiments, this limited location overlay filter is still available for the content captured in that location even after the device moves to a different location. The content stored in application storage may then later be communicated using a chat or messaging interface using special filters based on metadata. The ability to edit content from application storage to add overlays or drawings and then communicate the content applies both to individual pieces of content as well as entire content collections. Such metadata may be used with image tags to enhance visual search as described below.

For content stored in camera roll storage, some metadata may be accessed by the application 104 and similarly used to apply some filters to the content. Application 104 allows temporary editing and drawing on top of content from camera roll storage. In some embodiments, a user may selectively overwrite the camera roll file with edits. In other embodiments, the application 104 does not overwrite camera roll content with versions of the content including filters or overlay drawings, but makes a local copy in application storage. If the user does not store copies of camera roll content with added overlays within application storage or camera roll storage, the additions are lost when the user closes application 104 or navigates away from the camera roll content with added overlays.

As described below, various metadata and object recognition processing is applied to content in some embodiments. This enables searching and sorting of content within application storage. Text searching can be used to identify content based on metadata such as location name, content of images, context information from images, or any other such information (e.g. "Ho" may identify images associated with Houston Texas and "home" as identified by metadata and object recognition data.) In some embodiments, this searching is used to present one or more interfaces with dynamically sorted content. One example embodiment includes user interfaces for content that was generated near to a current location of the device presenting the interface. Another example embodiment includes a "flashback" interface that displays content associated with a related day or time (e.g. the same day or week of a previous year or a previous instance of a current event that is associated with a current time/location of the client device 102.) Similarly, more complex search and sorting associations can be generated. For example, certain times (e.g. days of the week) can be associated with presenting certain image content. In one embodiments, Friday afternoons can be associated with images of the beach, so that a search category of beach images is presented to a user only on Fridays after noon, or the search category is ranked and presented higher on Fridays after noon. In some embodiments, a server controlled system is used to selected search categories based on server selected criteria. For example, public news trends can be used to select certain search criteria which is then used to present certain groupings of local content from application storage. In one example, an Olympic victory in a certain event for a certain country may initiate a server side command for devices within the associated country to prioritize local search groups associated with that event. As described herein, however, while search categories may be managed by a server system, the image tagging used to generate local results is performed on the mobile device.

In some embodiments, application storage is divided into non-private content and private content. In such embodiments, non-private content is not encrypted and is synchronized with content storage 124 on a server and presented within user interfaces of application 104 with no security. Application storage content marked as private can be managed in different ways. In some embodiments, such content is encrypted, and is only displayed within the user interfaces of application 104 after a password is entered into application 104. In one embodiment, such a password is a 4-digit numerical personal identification number (PIN). In another embodiment, a 16 character passphrase is used and used for greater encryption. In some such embodiments, a user is notified that the server system does not store passphrases and the user will lose all access to private content is a passphrase is forgotten. In some embodiments, private content is encrypted at the client device, with encrypted copies of the content synchronized to the content storage 124 within a server system, such that the content can be accessed at other devices associated with a shared account using the PIN or passphrase. In other embodiments, private content is stored locally with no copy stored within server-based content storage 124. In some embodiments, private content is shareable via messaging or chat interfaces after a PIN or passphrase is entered. In some embodiments, private content is not shareable.

Application 104 operates, as described herein, as part of an ephemeral messaging system. Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. Visual tagging operations as described for various embodiments below are, however, performed on the mobile device for reasons described above.

The messaging server system 108 supports various services and operations that are provided to the messaging client application 104. Such operations include transmitting data to, receiving data from, and processing data generated by the messaging client application 104. In some embodiments, this data includes message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration; login functionality; the sending of messages via the application server 112 from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of a list of friends of a user of a client device 102; the retrieval of such collections; the retrieval of messages and content; the adding and deletion of friends to a social graph; the location of friends within a social graph; opening an application event (e.g., relating to the messaging client application 104).

The application server 112 hosts a number of applications and subsystems, including a messaging server application 114, an image processing system 116, a social network system 122, and content storage 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 (shown in FIG. 3) within the database(s) 120. Examples of functions and services supported by the social network system 122 include the identification of other users of the messaging system 100 with which a particular user has relationships or is "following," and also the identification of other entities and interests of a particular user.

Content storage 124 interacts with local storage from client devices to synchronize non-ephemeral non-private content between multiple devices associated with a single user account, and to manage any communication of such content to devices of other accounts as part of a communication from one account to another account.

The application server 112 is communicatively coupled to a database server(s) 118, which facilitates access to a database(s) 120 in which is stored data associated with messages processed by the messaging server application 114.

Figure 2:
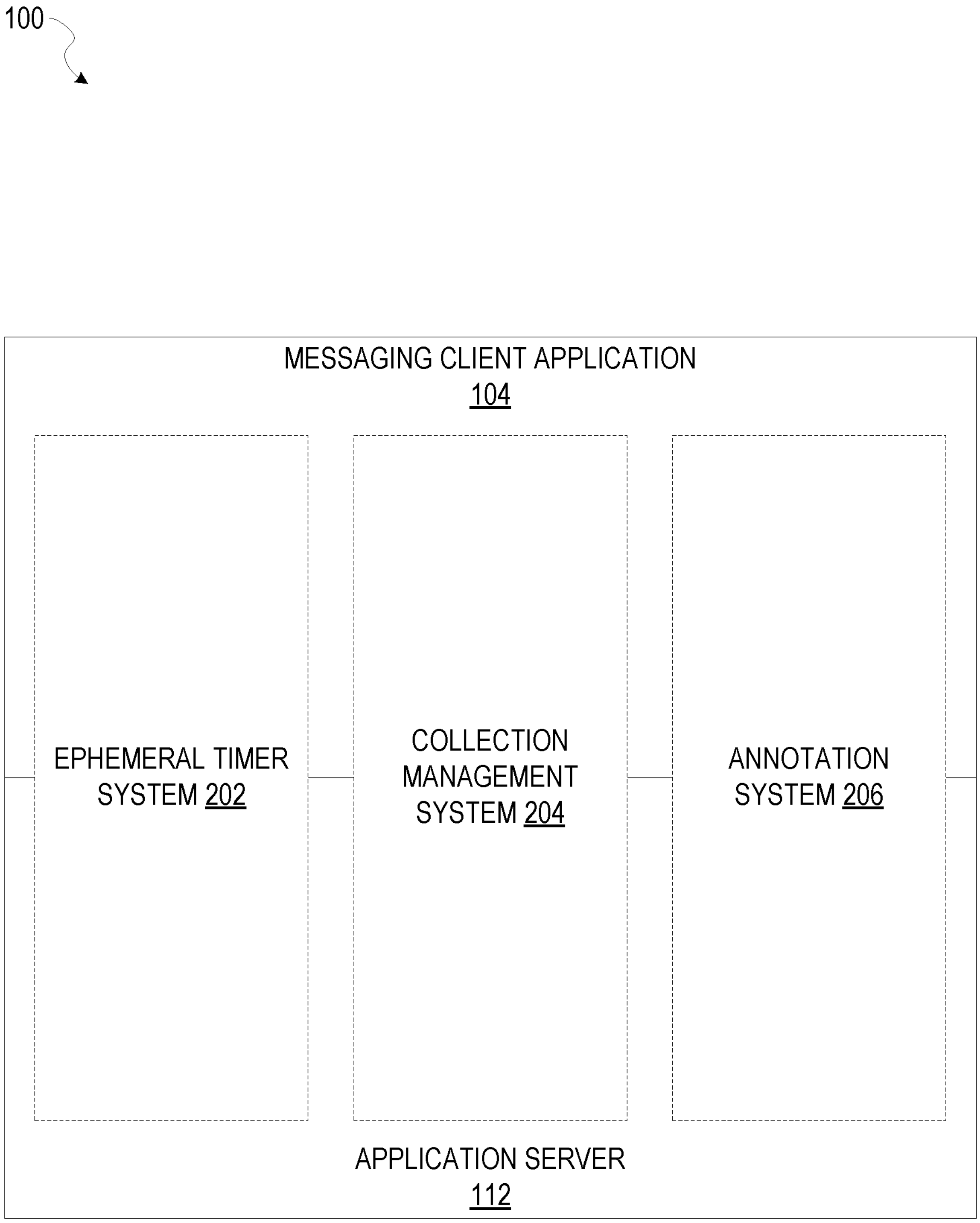
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 20 and accessed through the database server(s) 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

In various embodiments, visual search operations described herein may process both copies of images without added annotations, copies of images including annotations, or both depending on user selections and system settings.

Figure 3:
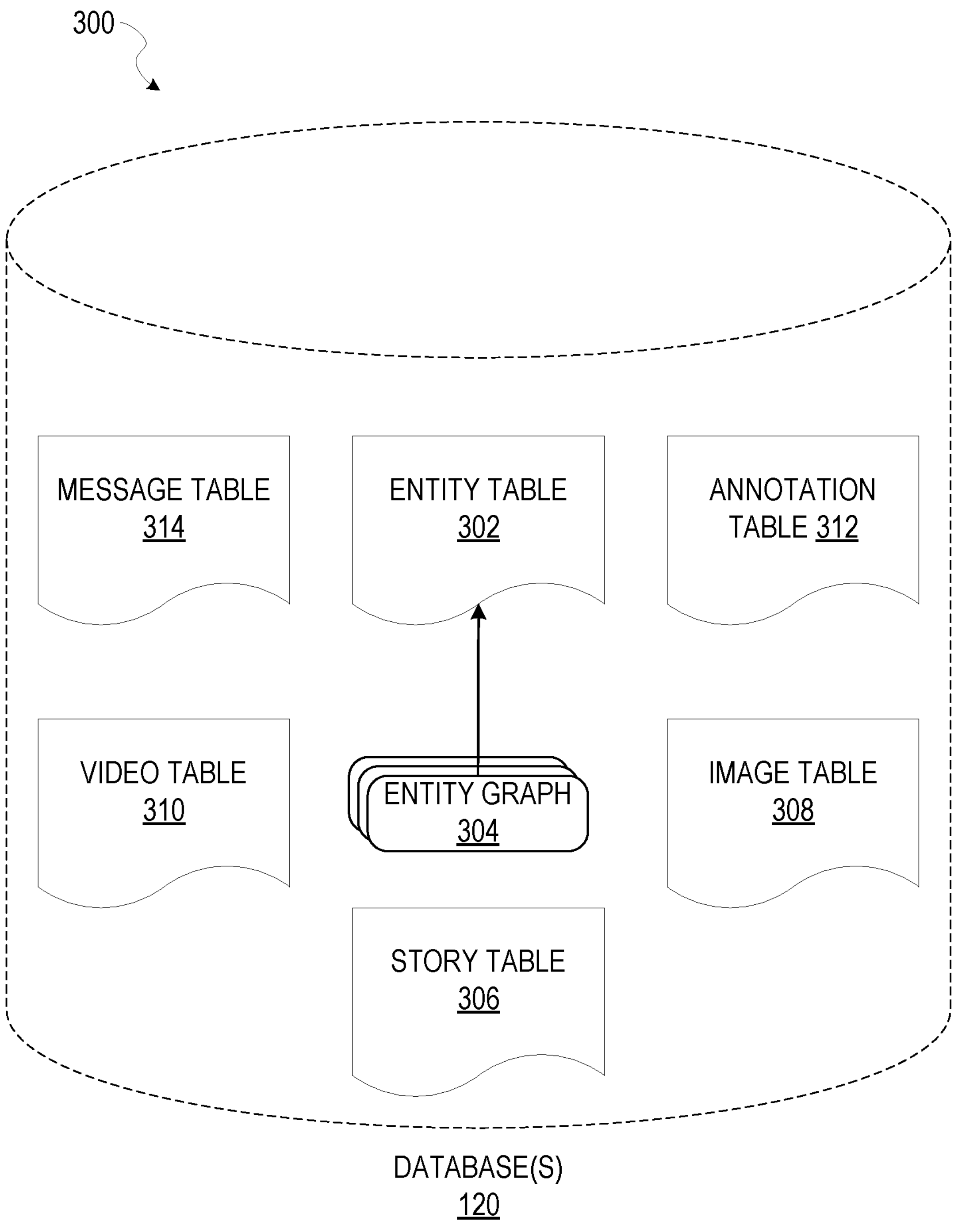
FIG. 3 is a schematic diagram illustrating data which may be stored in the database of the messaging server system, according to certain example embodiments.

FIG. 3 is a schematic diagram illustrating data 300 which may be stored in the database(s) 120 of the messaging server system 108, according to certain example embodiments. While the content of the database(s) 120 is shown to comprise a number of tables, it will be appreciated that the data could be stored in other types of data structures (e.g., as an object-oriented database).

The database(s) 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interest-based or activity-based, merely for example.

The database(s) 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
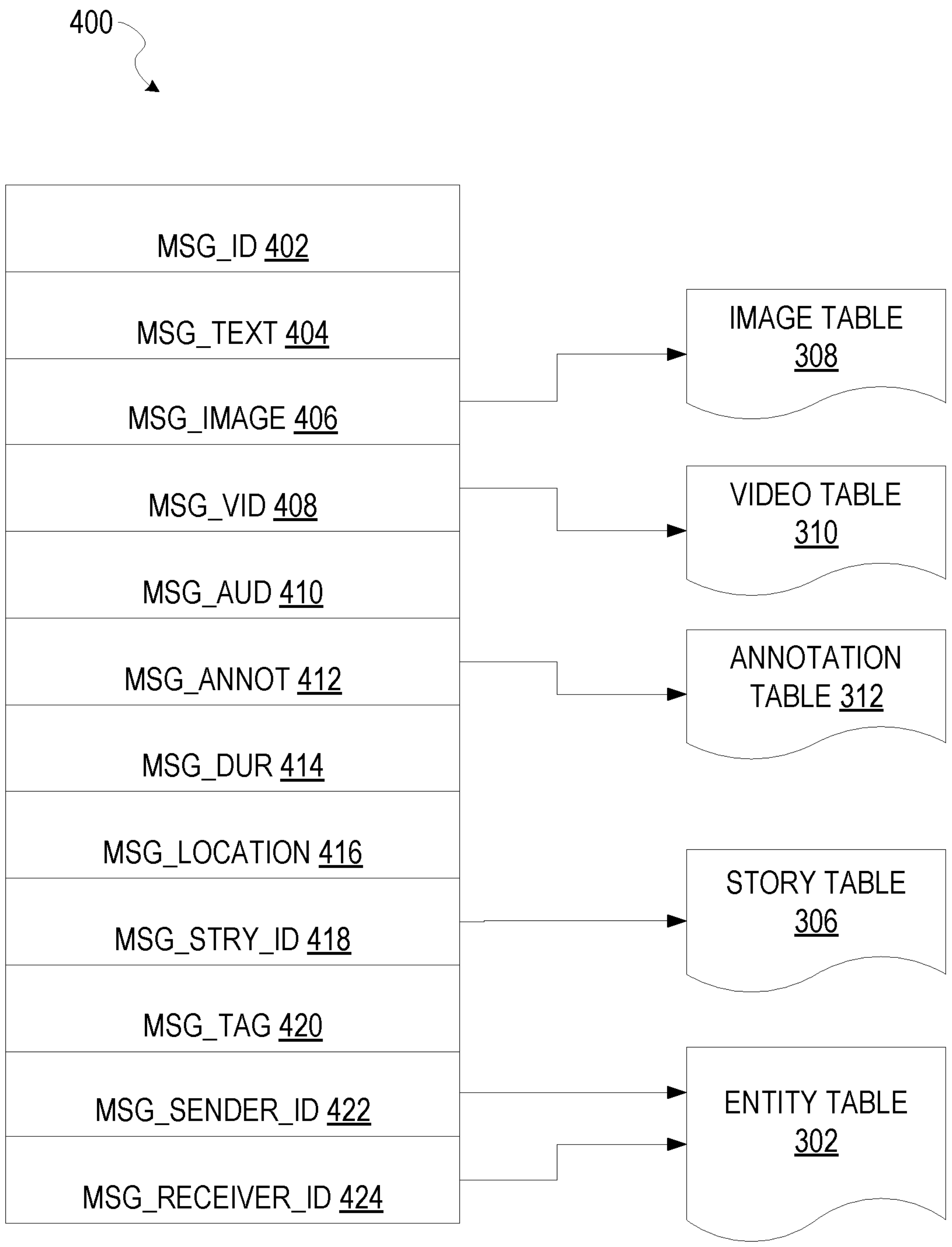
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database(s) 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represent annotations to be applied to message image payload 406, message video payload 408, or message audio payload 410 of the message 400.
- A message duration parameter 414: parameter value indicating, in seconds, the amount of time for which content of the message 400 (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).
- A message story identifier 418: values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address or device identifier) indicative of a user of the client device 102 on which the message 400 was generated and from which the message 400 was sent.
- A message receiver identifier 424: an identifier (e.g., a messaging system identifier, email address or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
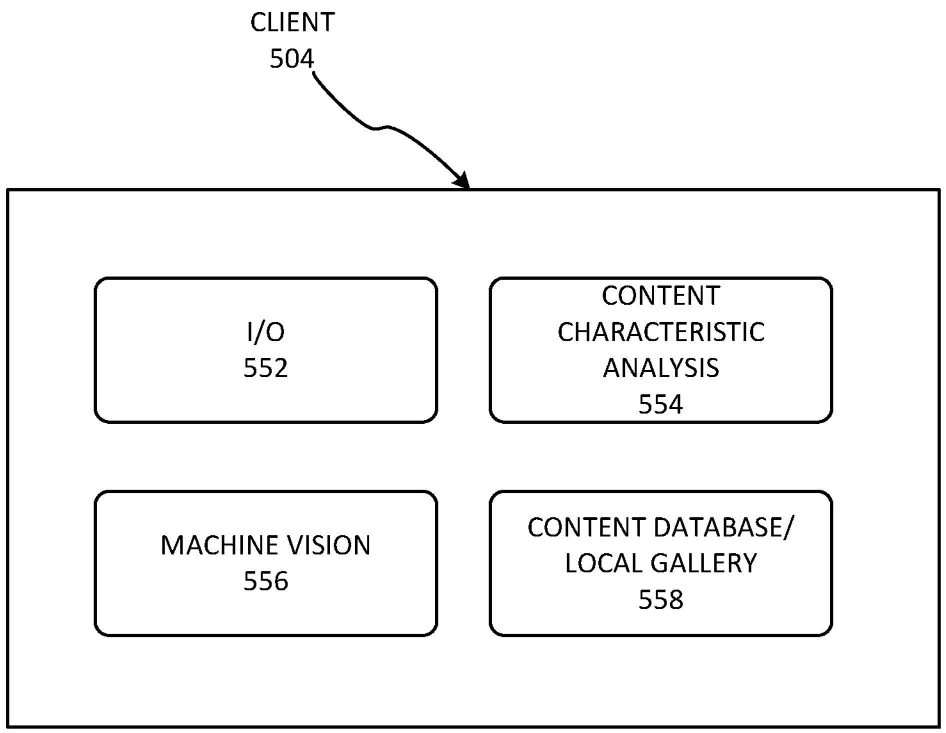
FIG. 5 illustrates aspects of systems and devices for image tagging and local visual search in accordance with some embodiments.

FIG. 5 illustrates aspects of a client 504 for local image tagging and visual search according to some example embodiments. The example client 504 includes input and output (I/O) module 552, content characteristic analysis module 554, object recognition module 556, and content database 558.

I/O module 552 may include any hardware, firmware, or software elements needed to send and receive content. In some embodiments this includes images sensors. In some embodiments this includes network interfaces for receiving images from other devices via a messaging network. Content characteristic analysis module 554 may include devices, processors, and software to analyze images from pictures and frames of video clips, and then determine content characteristics, including details about when and where a picture or video was generated. In certain embodiments, content characteristic analysis module 554 may be implemented as a plurality of different modules, each analyzing a different content characteristic, including any content characteristic described herein.

Object recognition module 556 describes a particular module that may be used to identify content characteristics based on the content of an image or images in a video. Object recognition module 556 includes hardware, firmware, and/or software for analyzing and understanding content. In one embodiment, object recognition module 556 is associated with a dictionary comprising image and video content values. Objects identified in images of a piece of content and the arrangement of the identified objects therein may be used by object recognition module 556, in such an embodiment, to select one or more content values from the dictionary as content characteristics. For example, a simple object recognition module 556 may identify a ball in an image, and select the values "ball" and "game" as content characteristics. A more complex module may identify the type of ball as a basketball, and include "basketball" as a characteristic value. A still more complex object recognition module 556 may identify a basketball, a crowd, a court color, and an elevated perspective of the court to identify "professional basketball game" and "basketball arena" as content values for the content. The same complex object recognition module 556 may identify a basketball, a park background, and a concrete court surface and associate "amateur basketball game" and "playground basketball" as content values for the content that is illustrated as an example in FIG. 6. Such content values may operate as context values which are used to generate content collections as described herein. Other types of context values besides such content values, however, may be used to generate content collections without using content values, or in addition to such content values. For example, one embodiment of an image may have associated context data comprising location data (e.g. coordinates or a geofence), time data (e.g. a time of day, a day of the month, an hour, etc.) content values (e.g. trees, basketball court, a face, etc.) quality values (e.g. blur, exposure, brightness, contrast, etc.) or any other such values which are referred to herein as context data.

These content values generated by object recognition module 556 can then be stored in content database 558 along with other characteristic values. Such characteristic values can include: one or more content values (i.e., an identification of what's in the content); a generation time; a generation time period; a generation location; a generation area; one or more quality values; any metadata value associated with content; an identifier for a particular piece of content; or any other such values. In some embodiments, a copy of content may be stored in content database 558 with location information, capture time information, and any other such information about a piece of content. In certain embodiments, content database 558 may anonymously store details about content use. For example, client devices 102 can communicate details about presentation of the content on a screen of the device, and about screenshots taken of the content. Anonymous metrics about how often a piece of content is viewed as part of a content collection, how long the content is viewed for, and how frequently screenshots are taken may then be measured by client 504, as part of analysis by content characteristic analysis module 554, with the resulting data stored in content database 558. In some embodiments, content database 558 may include this content information with any content or content message information discussed above with respect to FIG. 4 or in any database or table structure discussed above.

Figure 6:
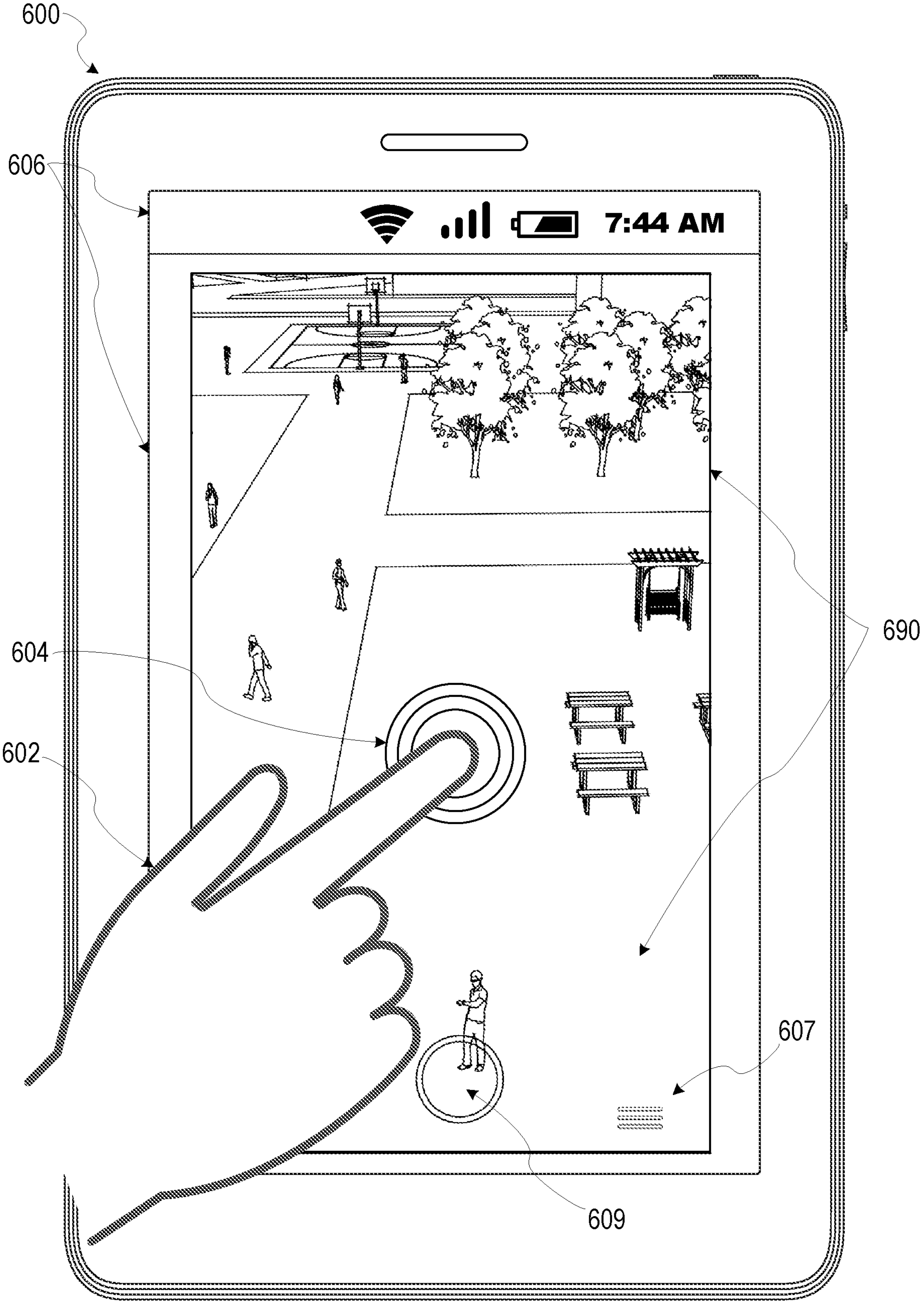
FIG. 6 illustrates aspects of a device for image tagging and visual search with some embodiments.

FIG. 6 shows aspects of a user interface for a message device 600 that may be used as part of a system as described herein. Message device 600, for example, may operate any elements of client 504 or client devices 102. FIG. 6 shows message device 600 with display area 606, which is a touch screen operating as both an output display and an input device. Device 600 may be used to capture content, which is then processed and analyzed according to embodiments described herein. The content illustrated in display area 606, for example, may be processed by the object recognition module 556 to identify a basketball, a park background, and a concrete court surface and associate "amateur basketball game" and "playground basketball" as context values for the content. Depending on other context values, such as location data, the context may be identified as "school" or "park" or "university".

In addition to various user interface elements, display area displays image 690 (e.g., the image 690 for content generated by the device 600), which includes both image data from a camera of device 600 as well as image capture user interface elements. Interface 607, for example, provides input options to send messages. Interface element 609 may be used to initiate capture of content (e.g., images or video clips) using the camera. Such content may then be analyzed locally as part of local organization or search within a gallery of content stored on the device 600 in accordance with the embodiments described herein.

Figure 7:
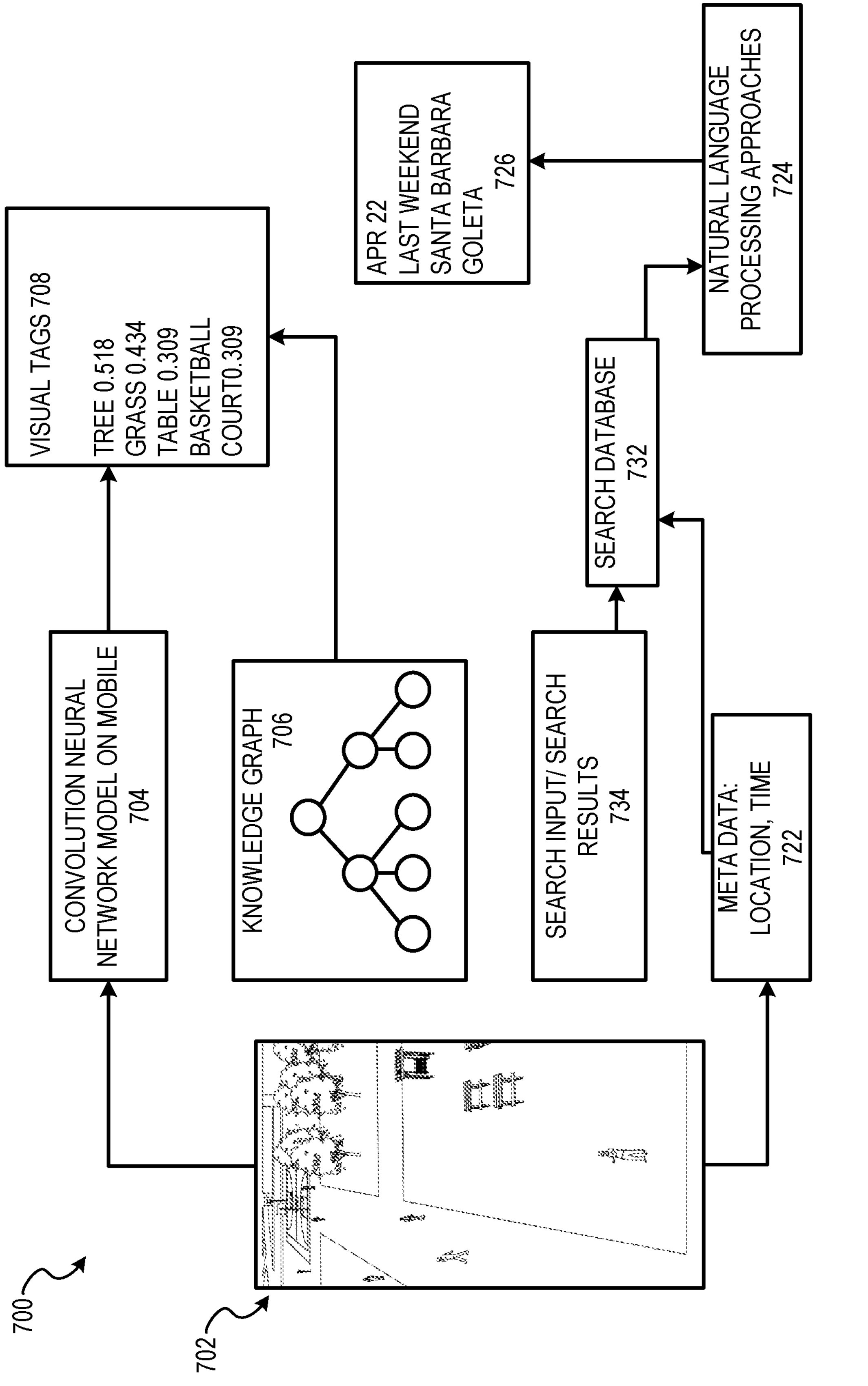
FIG. 7 illustrates aspects of a system for image tagging and visual search according to some embodiments.

FIG. 7 illustrates aspects of a system for image tagging and visual search according to some embodiments. As described above, image data 702 for an image is accessed by a mobile device such as client device 102 or machine 1300. The mobile device performs processing operations to generate extended visual search tags which are stored in a search database 732 or any such memory structure of the mobile device. These extended visual search tags are then used to generate a set of search results 734 when a search input is received at the mobile device. The extended visual search tags may be generated by a combination of image tagging and metadata analysis, or in various combinations of analysis with the image tagging operations described herein.

Figure 8:
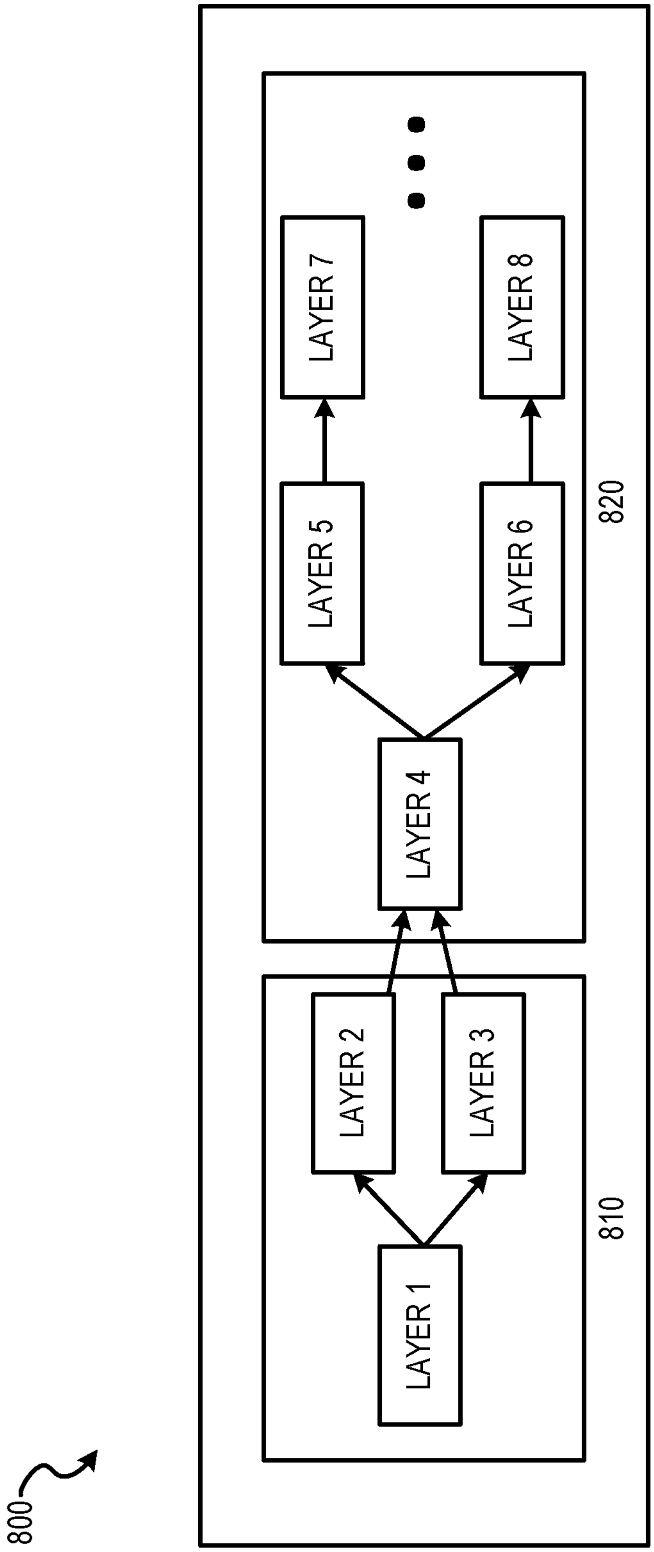
FIG. 8 illustrates aspects of DCNN in accordance with various embodiments described herein.

In the embodiment of FIG. 7, deep convolutional neural network (DCNN) 704 processes image data 702 to generate visual tags 708. In some embodiments, DCNN comprises a neural network structure along with a set of predetermined weights. The weights are determined by prior training of the DCNN using a set number of image recognition tags or items. In other words, the DCNN is trained to recognize a limited number of items. A DCNN trained to recognize a beach and a tree will generate output values associated with "beach" and "tree". The output values are compared with a threshold to determine if a tag for the items is associated with the image in the search database 732. Items in the image but not part of the DCNN training will simply be ignored. The number of items directly scored as part of the object recognition operation performed by DCNN 704 is thus limited, and can vary from tens of items to hundreds of items in some embodiments. As processing resources in mobile devices become more effective, thousands of items may be directly analyzed by a DCNN 702 operating in a resource constrained mobile device. In such systems, the use of a DCNN described in FIG. 8 provides more efficient resource usage to allow additional items and faster processing in a mobile environment. The use of a knowledge graph 706 may additionally be used to generate more complicated tags from a limited set of items that are directly trained into and analyzed by a DCNN.

A set of visual tags 708 are then assigned to the image data 702 based on output values from the DCNN 704. Visual tags 708 include output values for particular items that are part of the DCNN prior training, including tree with a value of 0.518, grass with a value of 0.434, table with a value of 0.309, and basketball court with a value of 0.309. These values are presented for illustrative purposes, and it is to be understood that different values and items may be used in different embodiments. Visual tags 708 includes items for which the output scores exceed a threshold (e.g. 0.3). Other items, such as beach, cat, dog, car, house, or shoes, may be items that are part of DCNN training, but for which the output values are below the threshold. For those items, no associated tag is generated for image data 702. Additional details of DCNN operation are described below with respect to FIGS. 8 and 9.

In addition to the use of DCNN operations to generate visual tags to assist with visual search, natural language processing or other processing of metadata can be used in conjunction with visual tags 708 to provide more comprehensive search results. Metadata 722 includes data such as location data from a positioning system that captures a device location when image data 702 is generated, as well as time data for a capture time associated with image data 702. Natural language processing 724 can be used to associate both visual tags 708 and metadata 722 with much more complex natural language matches 726 for inclusion in search database 732 and to search results 734 for natural language search inputs.

In various embodiments such as the embodiment of FIG. 7, because tagging, indexing, and ranking are all performed on the device, the search experience is extremely fast. For example, the search autocomplete function returns almost instantly, leading to a much better user experience than similar server-side autocomplete methods. In addition to traditional keyword/tag matching, semantic matching for image search tags based on natural language processing techniques significantly increase the coverage and quality of the image search experience. In one embodiment, a semantic augmentation technique works by analyzing each word in the search query and matching it semantically to the best possible visual tags generated by the visual recognition algorithm.

One particular embodiment of sematic augmentation comprises a use of ensembles of textual embeddings from a diverse set of very large textual datasets, such as Wikipedia™ and other such text sources. Textual embeddings are projections of word into a low dimensional space, from which similarity metrics can be derived. Using low dimensional similarity metrics, the textual embeddings are systematically aggregated, producing candidate lists of synonyms as well as similar words semantically related to the output tags obtained from the visual recognition algorithm. The candidate lists are filtered using heuristics and visual inspection. The output of this process is a database (e.g search database 732 in some embodiments) of visual tags along with associated list of synonyms and related words. This abovementioned technique for semantic augmentation of visual tags using natural language processing significantly broadens the coverage of the search results and consequently improves the overall visual search experience.

FIG. 8 illustrates aspects of DCNN in accordance with various embodiments described herein. The deep neural network structure consists of variant number of basic layers. The partial DCNN structure 800 of FIG. 8 includes layers 801 through 808. There are multiple types of layers, such as a convolution layer, a pooling layer, and a fully-connected layer. From high-level abstraction, the convolution layer(s) and pooling layer(s) serve as feature descriptors (e.g. similar to descriptors for a person like a fingerprint or face description) extractor; and the fully-connected layer(s) serve as the classifier. Each layer has associated parameters that are set during a training phase that is used to generate the particular DCNN that is communicated to and used by a mobile device after the parameters have been determined by training. Such neural network models may have tens of millions of parameters, and are extremely computationally expensive. Training, therefore, is conducted remotely via high resource computing systems, and the parameters and any necessary details of the DCNN are then transferred to mobile devices following training.

Figure 9:
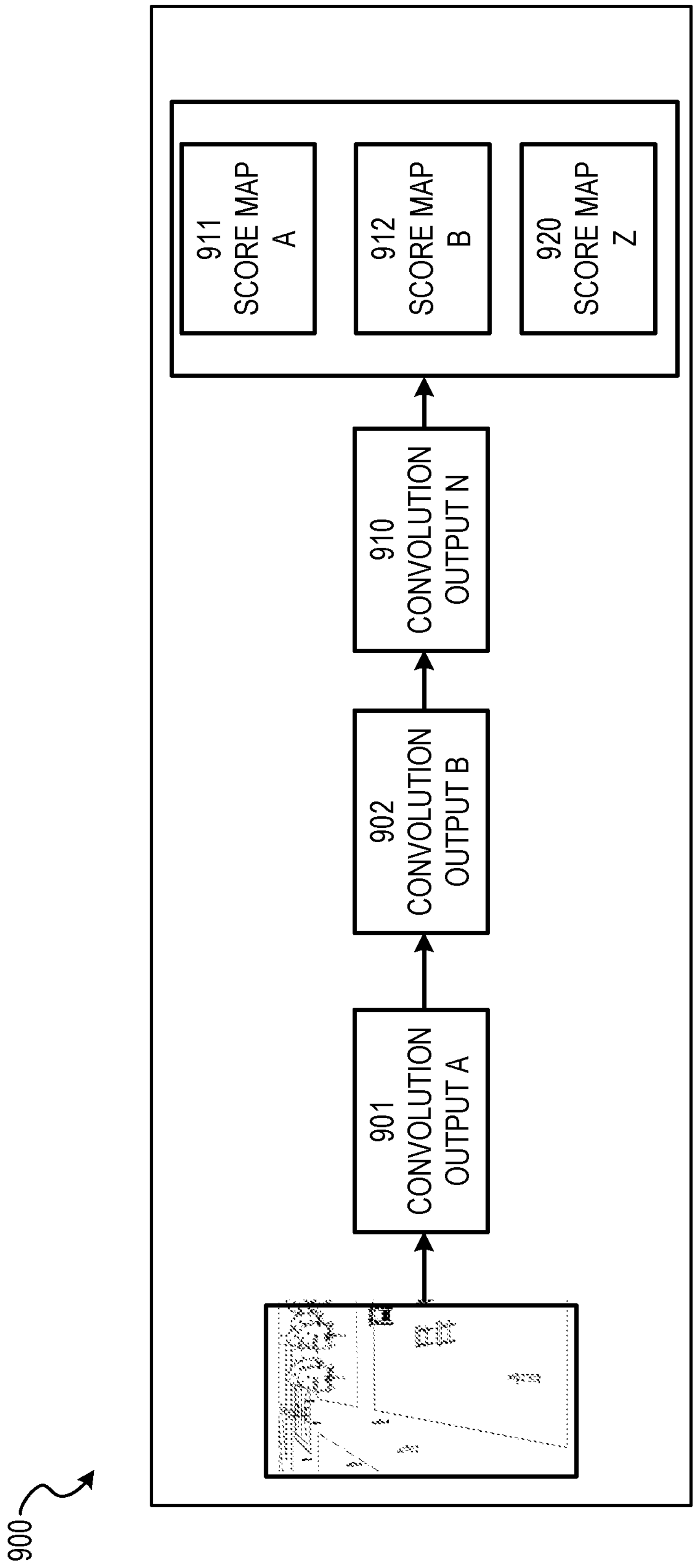
FIG. 9 illustrates aspects of operations for image processing and visual search in accordance with some embodiments.

The convolutional layers are the core of the DCNN models used by various embodiments. The convolutional layer parameters include a set of learnable filters in a matrix form with a height and width less than the image being processed with the DCNN. During a processing operating where image data is analyzed with a DCNN, for a convolutional layer, each filter (also referred to as a kernel) is convolved across the width and height of the input image, computing the dot product between the entries of the filter and the input and producing a 2-dimensional activation map of that filter. Sufficient activity associated with a particular kernel indicates that the DCNN was previously trained to identify and tag images using an item or image type (e.g. car, cat, tree) that set the parameters of the particular activated kernel. As illustrated in FIG. 9, multiple convolutional layers, each with associated kernels, may be part of a single DCNN to generate output values for image data.

Convolutional layers of layers 801-808 may generate convolution outputs 901, 902, 910, and etcetera. Such convolution outputs are computed by the following operation of two matrixes (e.g. image data matrix A and kernel matrix B) having sizes $M_A \times N_A$ and $M_B \times N_B$. The resulting convolutional output matrix C is computed as:

$$C(x,y)=\Sigma_{m\in[0,M_a-1]}\Sigma_{n\in[0,N_a-1]}A(m,n)B(i-m,j-n) \quad (1)$$

where $x\in[0,M_a+M_b-1)$ and $y\in[0,N_a+N_b-1)$

Layers 801-808 may additional include pooling or subsampling layers. A pooling layer is used to reduce the size of output from convolutional layer. Various embodiments use max-pooling (e.g. layers that select the largest value from a subset of the matrix and uses that single value to replace multiple other matrix elements) layers and average-pooling layers (e.g. layers that replace a subset of a matrix with an average value of the replaced matrix elements). For example, in a matrix with 4×4 elements, by applying the max pooling operation on each 2×2 block (generating 1 output from each 2×2 block), the output would be a 2×2 matrix. In a max-pooling layer, each 2×2 block is replaced with a single element having the value of the highest value element from the previous 2×2 blocks. The four 2×2 blocks of the original 4×4 matrix are thus replaced with single elements to generate a new 2×2 matrix.

A fully connected layer represents that each node at a layer connects to all the nodes from previous layers. Such a layer may be defined mathematically by the inner product of the previous layer's output and the layer parameters.

The embodiment of FIG. 8 illustrates that different layers may connect with other layers in a variety of ways. The layers of a DCNN may thus be structured as subgraphs, or collections of layers where some layers do not pass data to another subgraph directly. Partial DCNN structure 800 includes two subgraphs, shown as subgraph 810 and subgraph 820. Layer 801 is illustrated as passing intermediate data to both layer 2 and layer 3 of subgraph 810, but does not pass data to subgraph 820 (or any other subgraph).

Traditional convolutional neural network based approaches perform a forward inference sequentially and save all the intermediate outputs. Because an image recognition application typically contains tens of layers in a DCNN, previous DCNN schemas creates tens or hundreds of intermediate output layers that consume memory. To alleviate the intensive memory consumption issue, intermediate layers that do not pass data to another subgraph have their associated intermediate data deleted (e.g. actively deleted or alternatively having the previously used memory made available for other purposes without actively erasing or overwriting bits until needed). Some such embodiments operate by analyzing the dependency of layers (e.g. layers 801-808) in a layer graph (e.g. the layer graph of FIG. 8.) For example, such analysis may denote $\{O_i\}=^{i=1, \ldots N_t}$ as layer outputs from layers $\{L_i\}^{i=1, \ldots N_t}$; and denote $\{L_i\}^{i=N_{t+1}, \ldots N}$ as all the left layers that we haven't performed forward passing. The analysis identifies all the edges which connect subgraph $\{L_i\}^{i=1, \ldots N_t}$ and subgraph $\{L_i\}^{i=N_t+1, \ldots N}$. All the layer outputs which are not related to the connecting edges will be immediately deleted. Because the deleted layer outputs does not contribute to any following inference, it does not affect the recognition result (e.g. tags associated with an image), and in some embodiments saves more than half of the memory consumption over previous DCNN operations.

FIG. 9 then illustrates aspects of visual tagging and visual search in accordance with some embodiments. In addition to the above described subgraph dependency optimization, some embodiments additionally include cross-region feature sharing operations. As described above, in a convolutional layer, a filter/kernel is convolved across the width and height of the input image. In standard operation of prior DCNNs, multiple windows has been proven to consistently improve object recognition performance. This previous operation is implemented by cropping an input image into multiple sub-windows from an image, and then aggregating the sub-window recognition results. In such known systems, each sub-window is classified independently. There are two obvious drawbacks of this approach. (1) It largely ignores the fact that convolutional outputs in different sub-windows are actually partially shared; and (2) It is be very costly to crop sub-windows because the running time is linear with respect to the number of crops performed. In embodiments described above, the whole image will be applied the convolutional kernels layer by layer and will pull out any sub-windows after a final convolutional layer. In this way, the convolutional kernels are only applied once to the overlapping areas of the sub-windows, and this significantly saves the computation resources in a resource limited mobile environment.

To improve performed in resource constrained mobile devices, some embodiments use a neural network architecture which contains only convolutional layers except the last prediction layer. During training time (e.g. generation of values on a system with significant resources), the last layer serves as a fully-connected layer to produce classification scores. Following training of the DCNN, this fully connected layer is converted to as a convolutional layer. In this way, each convolutional kernel produce a prediction score map for an image category. In such embodiments, the generated framework is capable of obtaining dense sub-window recognition scores by applying convolutional kernels layer by layer to the whole image (instead of cropped sub-windows).

The values generated by training are then used to implement a DCNN on a mobile device. As illustrated by FIG. 9, the trained DCNN 900 includes convolutional layers 901-910, where the last convolutional layer 910 is the convolutional layer converted from the fully connected layer in the training. Using this convolutional layer 910 converted from the fully connected layer, score maps 911-920 are generated.

Further still, in addition to various use of the sublayer dependency memory optimization and the cross-region feature sharing described above, various embodiments use estimated or compressed weight values. Typical DCNN implementations use floating point weights trained, stored, and used to analyze images with 32 bit floating numbers. In order to reduce the memory usage when applying the trained model in the resource constrained environment of mobile devices described herein, in some embodiments, 16 bit half precision values are used to store the floating point weights, thus saving 50% of memory usage. In another embodiment, 32 bit floating point weights are compressed to 8 bit indices, with original weights quantized into 256 bins. This quantization can be adaptively performed for each layer with clustering methods, such as k-means clustering. Using such compression, the memory size is reduced by about 75%, and the 8 bit weights of each layer are only decompressed when they are needed.

Figure 10:
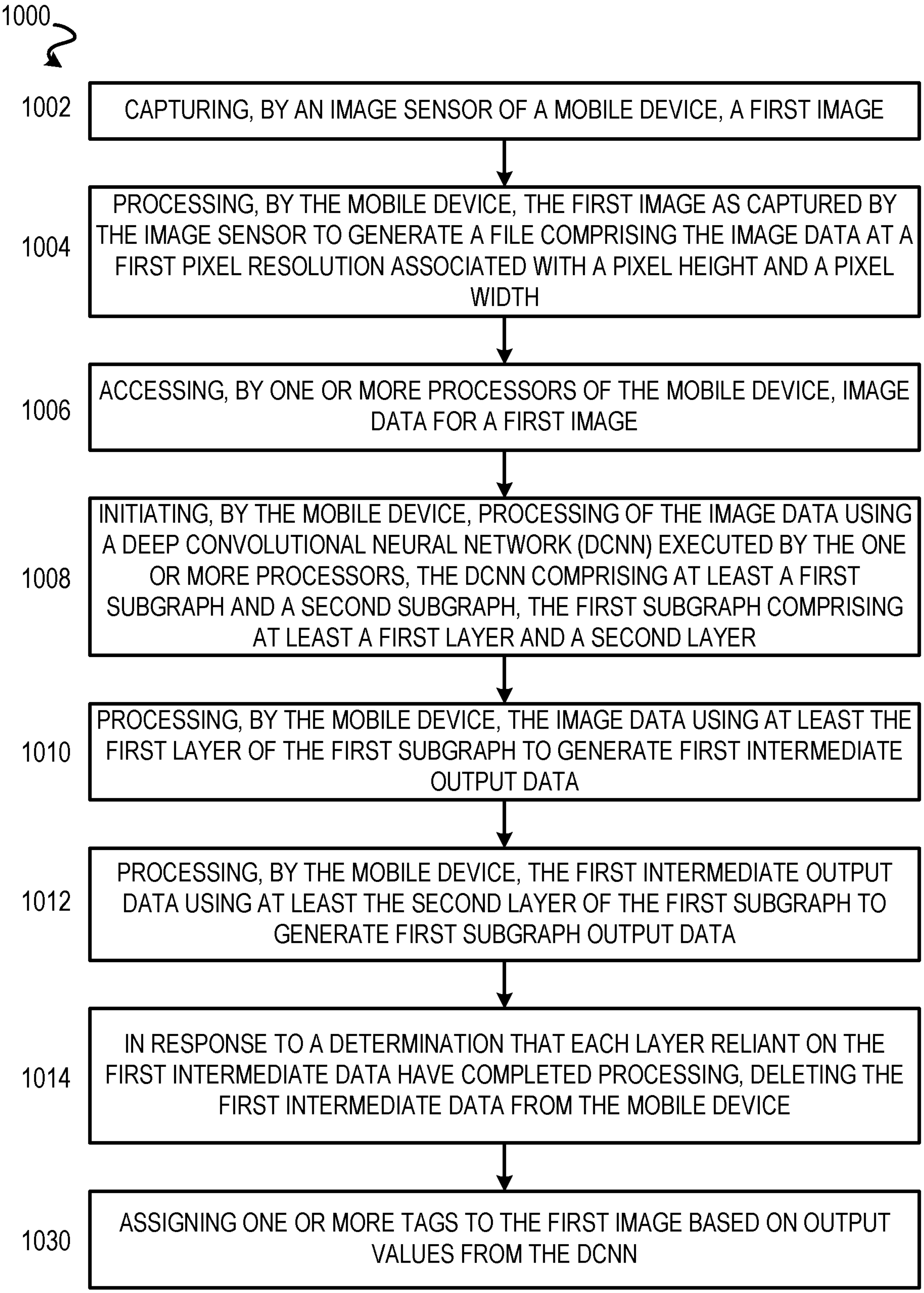
FIG. 10 illustrates aspects of operations for image processing and visual search in accordance with embodiments described herein.

FIGS. 9 and 10 illustrate aspects of operations for image processing and visual search in accordance with embodiments described herein. FIG. 9 describes one example method for object recognition, with method 1000 using a DCNN to generate tags for an image. Method 1000 is performed by a resource limited mobile device, such as client device 102 or a mobile machine 1300. In other embodiments, method 1000 is performed by a device comprising instructions that, when executed by one or more processors of a mobile device, cause the mobile device to perform the method 1000.

Method 1000 begins with operation 1002 capturing, by an image sensor of the mobile device, a first image. The image sensor may, for example, be an image sensor of I/O components 1318 in some embodiments. In operation 1004, the mobile device processes the first image as captured by the image sensor to generate a file comprising the image data at a first pixel resolution associated with a pixel height and a pixel width. Image data for the first image will therefore have a format or resolution corresponding to the pixel height and pixel width, which is later used in the correlation with DCNN convolution kernels. Operation 1006 involves accessing, by one or more processors of the mobile device, image data for a first image as stored on the mobile device. The DCNN one the mobile device then begins processing of the image data in operation 1008 using a deep convolutional neural network (DCNN) executed by the one or more processors. The structure of the DCNN includes at least a first subgraph and a second subgraph, the first subgraph comprising at least a first layer and a second layer. Such structure may include a wide variety of connections between different layers, and may include convolutional layers including convolution and subsampling operations.

As part of the DCNN analysis, method 1010 includes processing, by the mobile device, the image data using at least the first layer of the first subgraph to generate first intermediate output data. Operation 1012 then proceeds with processing, by the mobile device, the first intermediate output data using at least the second layer of the first subgraph to generate first subgraph output data, and in response to a determination in operation 104 that each layer reliant on the first intermediate data have completed processing, the first intermediate data is deleted from the mobile device. As described above, such a deletion may simply involve making the memory space that stored the intermediate data and passed it along for use by a subsequent layer available to store other information. The data may remain in the memory after the deletion until it is specifically overwritten as the memory space is used for other data.

Following this, the DCNN operation proceeds through all the layers, including any repetitions of similar operations or other operations, until output values are generated, and the output values are used to assign one or more tags to the first image based on the output values from the DCNN in operation 1030.

It will be apparent that the operations of method 1000 may be used in alternative embodiments, with various operations repeated or presented in different orders, and with any number of intermediate operations, as long as the particular combination is operable on a resource limited mobile device.

Figure 11:
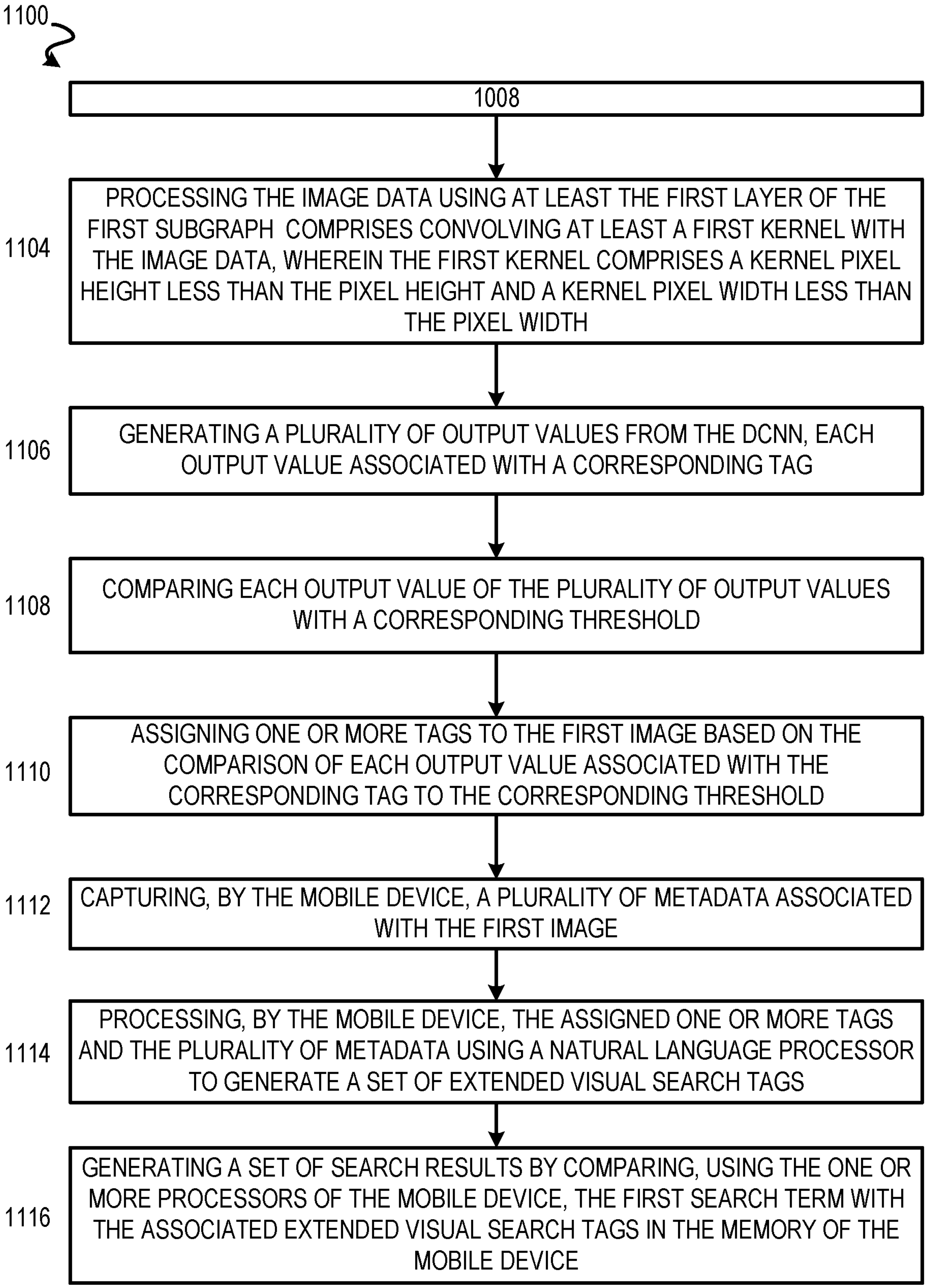
FIG. 11 illustrates aspects of a method for image tagging and visual search in accordance with embodiments described herein.

FIG. 11, for example, describes method 1100 where additional operations that occur in some embodiments following operation 1008. In method 1100, operation 1104 involves processing image data for an image using a first layer of a first subgraph to convolve a first kernel with the image data. The kernel is a matrix with a height and width smaller than the corresponding pixel height and width of the image. Thus, as described above, the kernel is convolved with the entire image.

In operation 1106, the DCNN generates a plurality of output values, where each output value is associated with a corresponding tag representing a possible item in an image. The output value varies based on the strength of the match estimated by the DCNN as previously trained. Each output value of the plurality of output values is compared with a corresponding threshold in operation 1108, and in operation 1110, one or more tags are assigned to the first image based on the comparison. The strength of the output value thus represents the confidence that the image includes the item associated with the particular output value.

In corresponding operations for semantic analysis or natural language processing, metadata associated with the image is captured in operation 1112. Such data may be any data captured by sensors, such as the sensors of I/O components 1318 for machine 1300. Such data may also be user input data rather than sensor data. Examples of such additional data include location data or time data for the position and time when the image was captured by the mobile device. In operation 1114, the mobile device processes the tags and the metadata to generate a set of extended search tags. In operation 1116, a set of search results are generated by comparing a user input search term with extended visual search information or tags. The search results may simply be a set of presented images, or may include images along with natural language result indicators identifying why the images are classified as results of the input search. In some embodiments, extended visual search tags (e.g. search information) is stored in a database as part of processing a newly captured image. In other embodiments, an image may be stored with DCNN produced tags and metadata, and extended visual search tags may only be generated when a user inputs a search.

In addition to the above specifically described embodiments, it will be apparent that other embodiments using the operations and DCNN structures described herein are possible.

Software Architecture

Figure 12:
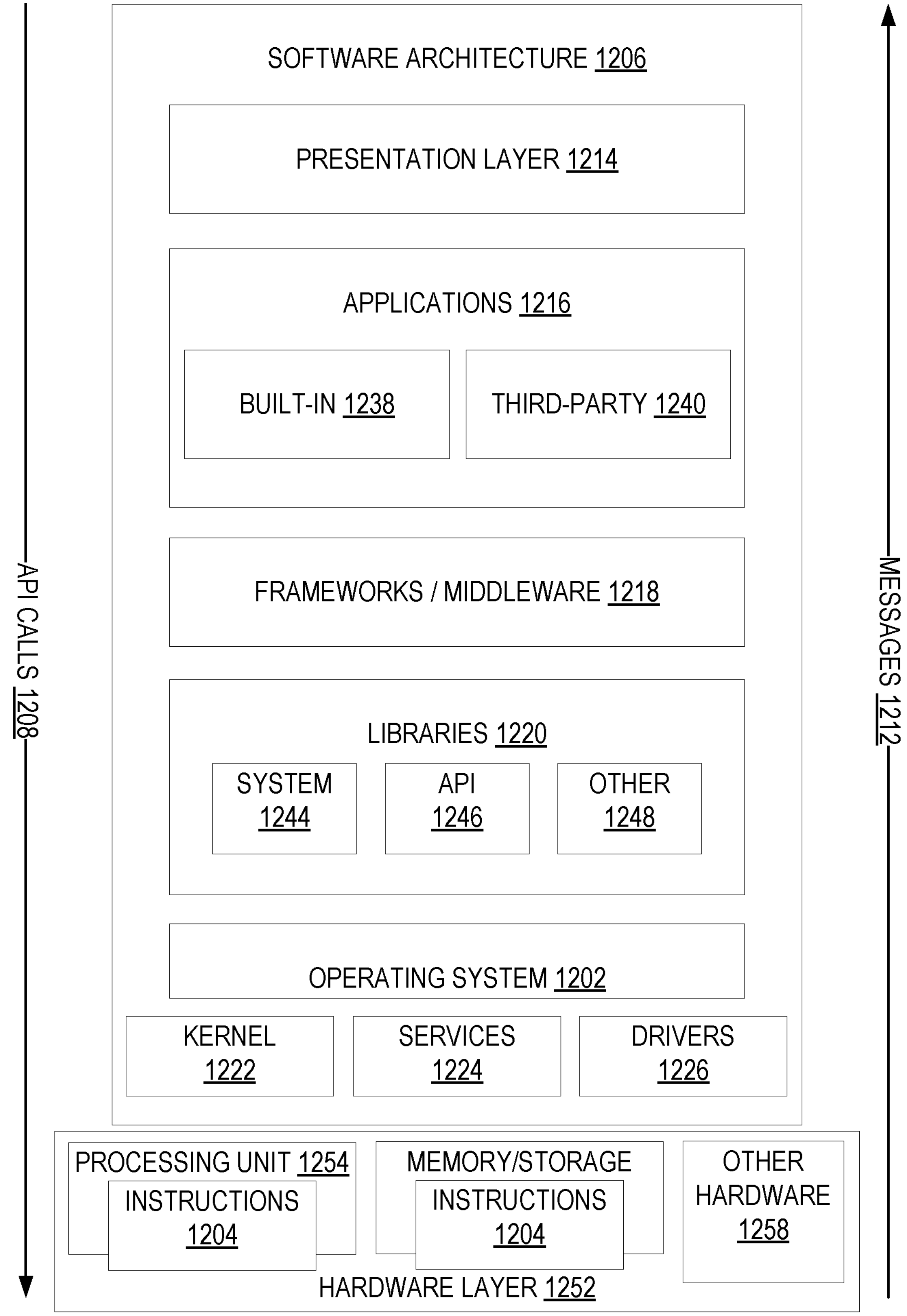
FIG. 12 is a block diagram illustrating a representative software architecture, which may be used in conjunction with various hardware architectures herein described and used to implement various embodiments.

FIG. 12 is a block diagram illustrating an example software architecture 1206, which may be used in conjunction with various hardware architectures herein described. FIG. 12 is a non-limiting example of a software architecture 1206 and it will be appreciated that many other architectures may be implemented to facilitate the functionality described herein. The software architecture 1206 may execute on hardware such as machine 1300 of FIG. 13 that includes, among other things, processors 1304, memory 1314, and I/O components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components and so forth described herein. The hardware layer 1252 also includes memory and/or storage modules memory/storage, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216 and a presentation layer 1214. Operationally, the applications 1216 and/or other components within the layers may invoke application programming interface (API) API calls 1208 through the software stack and receive messages 1212 in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224 and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224 and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

Figure 13:
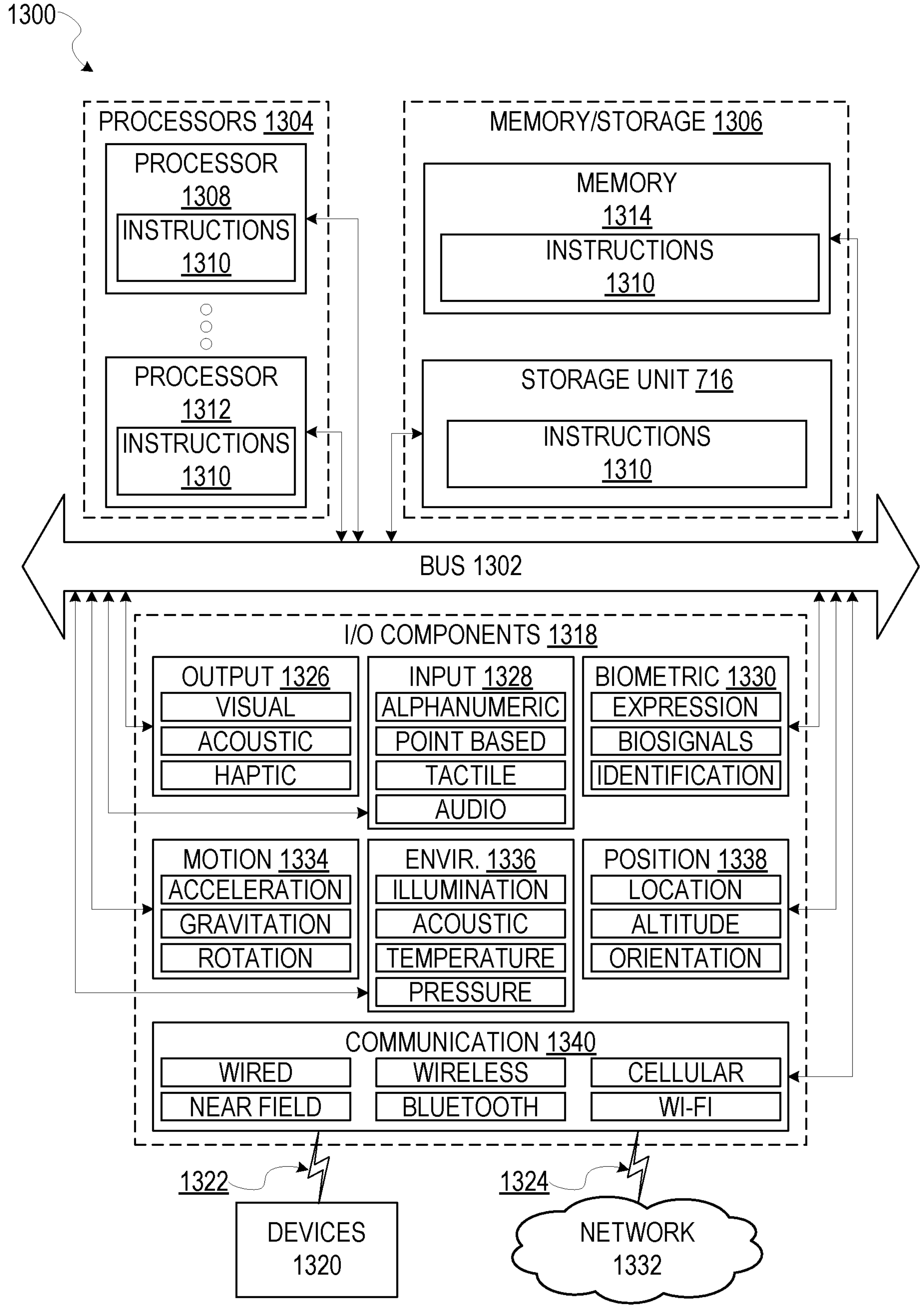
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1322 and coupling 1324 respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory, even if the message is temporarily stored in a non-transitory computer readable medium.

"MACHINE-READABLE MEDIUM" or "NON-TRANSITORY COMPUTER READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system comprising:

one or more processors; and one or more memories storing instructions that, when executed by the one or more processors, cause the system to perform operations comprising:

accessing image data;

decompressing a first plurality of floating point weights, in response to initiation of processing of the image data;

processing, using the first plurality of floating point weights, the image data using a first layer of a deep convolutional neural network (DCNN) to generate first intermediate data;

decompressing a second plurality of floating point weights, in response to initiation of processing the first intermediate data;

processing, using the second plurality of floating point weights, the first intermediate data using a second layer of the DCNN to generate first output data; and causing the first intermediate data to be deleted from the system.

2. The system of claim 1, wherein the operations further comprise:

receiving a plurality of weights for the DCNN, wherein the plurality of weights are floating point weights compressed to weight indexes, wherein the decompressing the first plurality of floating point weights further comprises:

decompressing the first plurality of floating point weights from the weight indexes.

3. The system of claim 2, wherein each weight index of weight indexes indicates a floating point weight of the first plurality of floating point weights.

4. The system of claim 1, wherein the system is a mobile device.

5. The system of claim 1, wherein the operation further comprise:

capturing, using an image sensor of the system, the image data;

processing the image data as captured by the image sensor to generate a file comprising the image data at a first pixel resolution associated with a pixel height and a pixel width; and storing the file in a second memory of the system.

6. The system of claim 5, wherein the first layer comprises a convolutional layer, and wherein processing, using the first plurality of floating point weights, the image data comprises: convolving a first kernel with the image data, wherein the first kernel comprises a kernel pixel height less than the pixel height and a kernel pixel width less than the pixel width.

7. The system of claim 6, wherein the first intermediate data comprises a plurality of matrixes, each matrix of the plurality of matrixes generated by convolving an associated kernel of a plurality of kernels of the first layer with the image data, wherein the plurality of kernels comprises the first kernel.

8. The system of claim 1, wherein the operations further comprise:

generating a plurality of output values from the first output data, each output value of the plurality of output values associated with a corresponding tag of a plurality of tags;

comparing the plurality of output values with a plurality of thresholds, the plurality of thresholds associated with the plurality of tags; and assigning tags of the plurality of tags if corresponding output values of the plurality of output values transgress corresponding thresholds of the plurality of thresholds.

9. The system of claim 8, wherein the operations further comprise:

accessing a plurality of metadata associated with the image data;

processing the assigned tags and the plurality of metadata using a natural language processor to generate extended visual search tags for the image data.

10. The system of claim 9 further comprising storing the image data and the extended visual search tags, in a memory of the system.

11. The system of claim 10 further comprising:

receiving, via an input device, a search term; and generating search results by comparing the search term with the extended visual search tags in the memory of the system.

12. The system of claim 1, wherein a first subgraph comprises the first layer of the DCNN and the second layer of the DCNN, and wherein the operations further comprise:

processing the first output data using a first layer of a second subgraph to generate second intermediate data;

processing the second intermediate data using a second layer of the second subgraph to generate second subgraph output data; and in response to determining that processing of each layer associated with the second intermediate data is completed, causing the second intermediate data to be deleted from the system.

13. The system of claim 12, wherein the operations further comprise:

processing the second subgraph output data using a fully connected layer converted to a convolutional layer to generate a dense prediction score map.

14. The system of claim 13, wherein the fully connected layer generates the dense prediction score map using an associated output from each convolution layer.

15. The system of claim 14, wherein the operations further comprise:

subsampling the dense prediction score map using a max-pooling operating to generate a plurality of output recognition scores, each output recognition score associated with one or more tags.

16. The system of claim 1, wherein the first plurality of floating point weights are 16 bit or 32 bit weights.

17. A non-transitory storage medium comprising instructions that, when executed by one or more processors of a system, cause the system to perform operations, the operations comprising:

accessing image data;

decompressing a first plurality of floating point weights, in response to initiation of processing of the image data;

processing, using the first plurality of floating point weights, the image data using a first layer of a deep convolutional neural network (DCNN) to generate first intermediate data;

decompressing a second plurality of floating point weights, in response to initiation of processing the first intermediate data;

processing, using the second plurality of floating point weights, the first intermediate data using a second layer of the DCNN to generate first output data; and causing the first intermediate data to be deleted from the system.

18. The non-transitory storage medium of claim 17, wherein the operations further comprise:

receiving a plurality of weights for the DCNN, wherein the plurality of weights are floating point weights compressed to weight indexes, wherein the decompressing the first plurality of floating point weights further comprises:

decompressing the first plurality of floating point weights from the weight indexes.

19. A method for a system, the method comprising:

accessing image data;

decompressing a first plurality of floating point weights;

decompressing a first plurality of floating point weights, in response to initiation of processing of the image data;

processing, using the first plurality of floating point weights, the image data using a first layer of a deep convolutional neural network (DCNN) to generate first intermediate data;

decompressing a second plurality of floating point weights, in response to initiation of processing the first intermediate data;

processing, using the second plurality of floating point weights, the first intermediate data using a second layer of the DCNN to generate first output data; and causing the first intermediate data to be deleted from the system.

20. The method of claim 19 further comprising:

receiving a plurality of weights for the DCNN, wherein the plurality of weights are floating point weights compressed to weight indexes, wherein the decompressing the first plurality of floating point weights further comprises:

decompressing the first plurality of floating point weights from the weight indexes.

* * * * *